(12) United States Patent
Mihara

(10) Patent No.: US 8,472,124 B2
(45) Date of Patent: Jun. 25, 2013

(54) IMAGE FORMING OPTICAL SYSTEM AND ELECTRONIC IMAGE PICKUP APPARATUS USING THE SAME

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 260 days.

(21) Appl. No.: 13/068,707

(22) Filed: May 18, 2011

(65) Prior Publication Data

US 2011/0285896 A1 Nov. 24, 2011

(30) Foreign Application Priority Data

May 24, 2010 (JP) .................................. 2010-118524

(51) Int. Cl.
*G02B 15/14* (2006.01)

(52) U.S. Cl.
USPC ........... 359/686; 359/676; 359/683; 359/684; 359/685; 359/689; 359/714; 359/715; 359/740; 359/764; 359/772

(58) Field of Classification Search
USPC ................. 359/676, 683–690, 714, 715, 740, 359/764, 772
See application file for complete search history.

(56) References Cited

U.S. PATENT DOCUMENTS

| | | | | |
|---|---|---|---|---|
| 5,568,321 A * | 10/1996 | Ogawa et al. | ................. | 359/676 |
| 7,609,446 B2 * | 10/2009 | Nanba | ............................ | 359/676 |
| 2010/0007966 A1 * | 1/2010 | Katakura | ....................... | 359/684 |
| 2010/0091173 A1 * | 4/2010 | Miyazaki et al. | ............. | 359/689 |
| 2010/0097497 A1 * | 4/2010 | Bito et al. | ....................... | 359/683 |

FOREIGN PATENT DOCUMENTS

JP 2003-140043 5/2003

* cited by examiner

Primary Examiner — Evelyn A. Lester
(74) Attorney, Agent, or Firm — Kenyon & Kenyon LLP

(57) ABSTRACT

In an image forming optical system which includes in order from an object side, a first lens group G1 having a positive refractive power, a second lens group G2 having a negative refractive power, a third lens group G3 having a positive refractive power, and a fourth lens group G4, and which includes maximum of five lens groups, and at the time of zooming from a wide angle end to a telephoto end, when a focal length of the overall image forming optical system is in a range of 1.2 fw to 1.8 fw, the first lens group G1 moves to be positioned more toward the object side than a position at the wide angle end, in a rectangular coordinate system in which, a horizontal axis is let to be vd(LA) and a vertical axis is let to be nd(LA), when a straight line expressed by $$nd(LA)=a \times vd(LA)+b(LA) \text{(provided that } a=-0.0267\text{)}$$

is set, the image forming optical system satisfies a predetermined conditional expression.

13 Claims, 23 Drawing Sheets

404.66 —··—··—
435.84 — — —
486.13 —·—·—
656.27 - - - - - -
578.56 ———

404.66 —··—··—
435.84 — — —
486.13 —·—·—
656.27 - - - -
578.56 ———

404.66
435.84
486.13
656.27
578.56

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2010-118524 filed on May 24, 2010; the entire contents of which are incorporated herein by reference.

BACKGROUND OF THE INVENTION

1. Field of the Invention

The present invention relates to an image forming optical system and an electronic image pickup apparatus using the same.

2. Description of the Related Arts

A digital camera has reached a level of being used practically, regarding making large the number of pixels (high image quality), and small-sizing and slimming. Also from a function point of view and a market point of view, a digital camera has substituted a silver salt 35 mm film camera. Therefore, as a next trend of evolution, an improvement in optical specifications, such as a high zooming ratio, and a wide angle, as well as, further increase in the number of pixels with the same size and slimness, have been sought strongly.

For improving specifications such as the zooming ratio and an angle of field with the same slimness of a digital camera, it is necessary to go on improving these specifications while maintaining same overall optical length of a zoom lens. As a conventional zoom lens having a short overall length, which is suitable for slimming of a main body of a digital camera, a zoom lens described in Japanese Patent Application Laid-open Publication No. 2003-140043 is available.

SUMMARY OF THE INVENTION

To solve the abovementioned issues, and to achieve an object, an image forming optical system according to the present invention includes in order from an object side a first lens group G1 having a positive refractive power, which includes only one cemented-lens component, a second lens group G2 having a negative refractive power, which includes two lens components namely, a negative lens component and a lens component of a cemented lens of a positive lens LA having a meniscus shape and a negative lens LB in order, a third lens group G3 having a positive refractive power, which includes two lens components namely, a positive lens component and a negative lens component, and a fourth lens group G4 which includes one lens component, and the image forming optical system includes maximum of five lens groups, and at the time of zooming from a wide angle end to a telephoto end, when a focal length of the overall image forming optical system is in a range of 1.2 fw to 1.8 fw, the first lens group G1 moves to be positioned more toward the object side than a position at the wide angle end, and in a rectangular coordinate system in which, a horizontal axis is let to be vd (LA) and a vertical axis is let to be nd(LA), when a straight line expressed by $$nd(LA)=a \times vd(LA)+b(LA)(\text{provided that } a=-0.0267)$$

is set, nd and vd of the positive lens LA are included in an area which is determined by a straight line when it is a lower limit value of a range of the following conditional expression (1) and a straight line when it is an upper limit value of the range of the following conditional expression (1), and an area determined by the following conditional expression (2)

$$2.0<b(LA)<2.4 (\text{provided that } nd(LA)>1.3) \quad (1)$$

$$vd(LA)<30 \quad (2)$$

where, fw denotes a focal length of the image forming optical system at wide angle end, vd(LA) denotes Abbe's number (nd(LA)−1)/(nd(LA)−nC(LA)) for the positive lens LA, and nd(LA), nC(LA), nF(LA) denote refractive indices of the positive lens LA for a d-line, a C-line, and an F-line respectively.

Moreover, an electronic image pickup apparatus according to the present invention includes the abovementioned image forming optical system, an electronic image pickup element, and an image processing unit which processes image data which has been obtained by picking up an image formed through (by) the image forming optical system by the electronic image pickup element, and outputs as image data in which, a shape (a form) of the image has been changed, and the image forming optical system satisfies the following conditional expression (A) at the time of infinite object point focusing, $$0.85 < y_{07}/(fw \cdot \tan \omega_{07w}) < 0.97 \quad (A)$$

where, $y_{07}$ is expressed as $y_{07}=0.7 \cdot y_{10}$, when a distance (the maximum image height) from a center up to the farthest point on an effective image pickup surface (on a surface on which an image can be picked up) of the electronic image pickup element is let to be $y_{10}$, $\omega_{07w}$ is an angle with respect to an optical axis in an object-point direction corresponding to an image point from a center on the image pickup surface up to a position of $y_{07}$, at a wide angle end, and fw is a focal length of the overall image forming zoom lens system at the wide angle end.

BRIEF DESCRIPTION OF THE DRAWINGS

FIG. 1A shows a state at a wide angle end, FIG. 1B shows an intermediate state, and FIG. 10 shows a state at a telephoto end;

FIG. 2A shows a state at the wide angle end, FIG. 2B shows an intermediate state, and FIG. 2C shows a state at the telephoto end;

FIG. 3A shows a state at a wide angle end, FIG. 3B shows an intermediate state, and FIG. 3C shows a state at a telephoto end;

FIG. 4A shows a state at the wide angle end, FIG. 4B shows an intermediate state, and FIG. 4C shows a state at the telephoto end, FIG. 5A shows a state at a wide angle end, FIG. 5B shows an intermediate state, and FIG. 5C shows a state at a telephoto end;

FIG. 6A shows a state at the wide angle end, FIG. 6B shows an intermediate state, and FIG. 6C shows a state at the telephoto end;

FIG. 7A shows a state at a wide angle end, FIG. 7B shows an intermediate state, and FIG. 7C shows a state at a telephoto end;

FIG. 8A shows a state at the wide angle end, FIG. 8B shows an intermediate state, and FIG. 8C shows a state at the telephoto end;

FIG. 9A shows a state at a wide angle end, FIG. 9B shows an intermediate state, and FIG. 9C shows a state at a telephoto end;

FIG. 10A, FIG. 10B, and FIG. 100 are diagrams showing a spherical aberration, an astigmatism, a distortion, and a chromatic aberration of magnification at the time of infinite object point focusing of the zoom lens according to the fifth embodiment, where, FIG. 10A shows a state at the wide angle end, FIG. 10B shows an intermediate state.

FIG. 11A shows a state at a wide angle end, FIG. 11B shows an intermediate state, and FIG. 11C shows a state at a telephoto end;

FIG. 12A shows a state at the wide angle end, FIG. 12B shows an intermediate state, and FIG. 12C shows a state at the telephoto end;

FIG. 13A shows a state at a wide angle end, FIG. 13B shows an intermediate state, and FIG. 13C shows a state at a telephoto end;

FIG. 14A shows a state at the wide angle end, FIG. 14B shows an intermediate state, and FIG. 14C shows a state at the telephoto end;

FIG. 15A shows a state at a wide angle end, FIG. 15B shows an intermediate state, and FIG. 15C shows a state at a telephoto end;

FIG. 16A shows a state at the wide angle end, FIG. 16B shows an intermediate state, and FIG. 16C shows a state at the telephoto end;

FIG. 23A is a front view of a mobile telephone 400, FIG. 23B is a side view of the mobile telephone 400, and FIG. 23C is a cross-sectional view of a photographic optical system 405.

DETAILED DESCRIPTION OF THE INVENTION

Figure 1A:
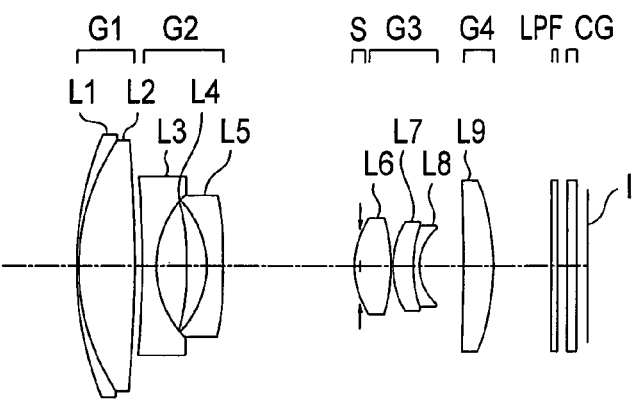
FIG. 1A, FIG. 1B, and FIG. 1C are cross-sectional views along an optical axis showing an optical arrangement at the time of infinite object point focusing of a zoom lens according to a first embodiment of the present invention, where.

Exemplary embodiments in which, an image forming optical system according to the present invention is used as a zooming optical system will be described below in detail by referring to the accompanying diagrams. However, the present invention is not restricted to the embodiments described below. Prior to the description of the embodiments, an action and an effect of the image forming optical system according to the embodiments will be described below.

In order to improve a zooming ratio and an angle of field while maintaining an overall length of an optical system as in a prior art, an image forming optical system of a type which includes in order from an object side a first lens group having a positive refractive power, which includes only one cemented-lens component, a second lens group G2 having a negative refractive power, which includes two lens components namely, a negative lens component and a lens component of a cemented lens of a positive lens LA having a meniscus shape and a negative lens LB in order, a third lens group G3 having a positive refractive power, which includes two lens components namely, a positive lens component and a negative lens component, and a fourth lens group G4 which includes one lens component, and the image forming optical system includes maximum of five lens groups, and in which, at the time of zooming from a wide angle end to a telephoto end, when a focal length of the overall image forming optical system is in a range of 1.2 fw to 1.8 fw, the first lens group G1 moves to be positioned more toward the object side than a position at the wide angle end, is used as a zooming optical system with a high zoom ratio according to the embodiments.

In this manner, the first lens group G1 has a positive refractive power, the second lens group G2 has a negative refractive power, the third lens group G3 has a positive refractive power, and the image forming optical system as a whole, includes four to five lens groups. Accordingly, from a point of paraxial arrangement, it is advantageous for shortening of the overall length and achieving a high zoom ratio. At the same time, it is easy to secure an image forming performance of a significantly high level even when the number of lens components is reduced to minimum for slimming when retracted. Moreover, when the first lens group G1 is let to have the abovementioned movement locus, it is possible to deal with an increase in an angle of field of more than 70 degrees.

Moreover, it is easy to carry out correction of a coma aberration and a meridional curvature of field which are susceptible to occur at a focal length slightly longer from a wide angle end in a design in which the overall length is shortened, and reduction of a diameter of the first lens group.

However, when an attempt is made to further shorten the overall length and to improve specifications such as a zoom ratio and an angle of field, the refractive power of the second lens group G2 which controls the zooming is to be increased. However, when an attempt is made to increase the refractive power of the second lens group, a chromatic aberration is susceptible to increase and Petzval's sum is susceptible to increase on a negative side.

Therefore, according to the present invention, in a rectangular coordinate system in which, a horizontal axis is let to be vd(LA) and a vertical axis is let to be nd(LA), when a straight line expressed by $$nd(LA)=a \times vd(LA)+b(LA)(\text{provided that } a=-0.0267),$$

nd and vd of the positive lens LA are included in an area which is determined by a straight line when it is a lower limit value of a range of the following conditional expression (1) and a straight line when it is an upper limit value of the range of the following conditional expression (1), and an area determined by the following conditional expression (2).

$$2.0<b(LA)<2.4(\text{provided that } nd(LA)>1.3) \tag{1}$$

$$vd(LA)<30 \tag{2}$$

where, vd(LA) denotes Abbe's number (nd(LA)−1)/(nF(LA)−nC(LA)) for the positive lens LA, and nd(LA), nC(LA), nF(LA) denote refractive indices of the positive lens LA for a d-line, a C-line, and an F-line respectively.

Conditional expression (1) is related to a refractive index and Abbe's number of a glass material of the positive lens LA. When a material which surpasses an upper limit value of conditional expression (1) is used, although the correction of the chromatic aberration is possible, Petzval's sum is susceptible to become excessively large and correction of the curvature of field is difficult.

Whereas, when a material which surpasses a lower limit value of conditional expression (1) is used, an amount of change in zooming for various aberrations such as a spherical aberration, the meridional curvature of field is susceptible to become large, and it becomes difficult to achieve stable image forming performance in overall zoom range.

Conditional expression (2) is an expression in which, an upper limit value of Abbe's number of a glass material of the positive lens LA is regulated concomitantly with conditional expression (1). When a glass material which surpasses the upper limit value is used, an achromatism for the F-line and the C-line becomes difficult, and therefore it is not preferable.

It is more preferable that the following conditional expression (1') is satisfied instead of conditional expression (1).

$$2.04<b1<2.34(\text{provided that } nd1>1.3) \tag{1'}$$

Furthermore, it is all the more preferable that the following conditional expression (1") is satisfied instead of conditional expression (1).

$$2.08<b1<2.28(\text{provided that } nd1>1.3) \tag{1"}$$

It is more preferable that the following conditional expression (2') is satisfied instead of conditional expression (2).

$$vd1<27 \tag{2'}$$

Furthermore, it is all the more preferable that the following conditional expression (2") is satisfied instead of conditional expression (2).

$$vd1<24 \tag{2"}$$

Moreover, it is preferable that in a rectangular coordinate system with a vertical axis let to be θgF(LA), when a straight line expressed by $$\theta gF(LA)=\alpha gF \times vd(LA)+\beta gF(LA)(\text{provided that } \alpha gF=-0.00566)$$

is set, θgF, nd, and vd of the positive lens are included in an area determined by a straight line when it is a lower limit value of a range of the following conditional expression (3) and a straight line when it is an upper limit value of the range of the following conditional expression (3), and the area determined by conditional expressions (1) and (2)

$$0.7700<\beta gF(LA)<0.8300 \tag{3}$$

where,

θgF(LA) denotes a partial dispersion ratio (ng−nF)/(nF−nC) of the positive lens LA, and ng(LA) denotes a refractive index for a g-line, of the positive lens LA.

Conditional expression (3) is related to a partial dispersion ratio θgF of a glass material of the positive lens LA. When a glass material which surpasses a lower limit value of conditional expression (3) is used for the positive lens LA, correction of a longitudinal chromatic aberration due to a secondary spectrum, or in other words, a longitudinal chromatic aberration for the g-line when achromatized, at the telephoto end, for the F-line and the C-line, is not sufficient. Therefore, in an image which has been picked up at the telephoto end in particular, it is difficult to secure sharpness on the overall image plane.

Whereas, when a glass material which surpasses an upper limit value of conditional expression (3) is used for the positive lens LA, correction of a chromatic aberration of magnification due to a secondary spectrum at the wide angle end, or in other words a chromatic aberration of magnification for g-line when achromatized for the F-line and the C-line, is not sufficient. Therefore, in an image which has been picked up at the wide angle end, it is difficult to secure sharpness in an area surrounding the image plane.

It is preferable that the following conditional expression (3') is satisfied instead of conditional expression (3).

$$0.7800 < \rho gF1 < 0.8200 \quad (3')$$

Furthermore, it is all the more preferable that the following conditional expression (3") is satisfied instead of conditional expression (3).

$$0.7900 < \beta gF1 < 0.8100 \quad (3'')$$

Moreover, in the image forming optical system according to the present invention, it is preferable that a lens component on the image side of the second lens group G2 has the cemented lens of the positive lens LA and the negative lens LB, and that a shape factor of the positive lens LA satisfies the following conditional expression (4).

$$1.1 < (ra+rb)/(ra-rb) < 6.0 \quad (4)$$

where, ra denotes a radius of curvature on an optical axis of a surface on the object side of the positive lens LA, and rb denotes a radius of curvature on an optical axis of a surface (a cemented surface) on an image side of the lens LA.

Conditional expression (4) is an expression related to the shape factor of the positive lens LA. When a lower limit value of conditional expression (4) is surpassed, it becomes difficult to secure high zoom ratio with a short overall length of the image forming optical system. When an upper limit value of conditional expression (4) is surpassed, an amount of change at the time of zooming, of various aberrations such as a chromatic aberration, a coma aberration, and the meridional curvature of field is susceptible to increase, and it becomes difficult to achieve a stable image forming performance in an overall zoom range.

It is more preferable that the shape factor of the positive lens LA satisfies the following conditional expression (4') instead of conditional expression (4).

$$1.2 < (ra+rb)/(ra-rb) < 5.0 \quad (4')$$

It is all the more preferable that the shape factor of the positive lens LA satisfies the following conditional expression (4") instead of conditional expression (4).

$$1.25 < (ra+rb)/(ra-rb) < 4.0 \quad (4'')$$

Incidentally, in a case of carrying out designing for shortening the overall length or slimming a depth when retracted, not only paraxial chromatic aberrations such as the longitudinal chromatic aberration and the chromatic aberration of magnification but also chromatic aberrations of high order such as a chromatic coma aberration, a chromatic meridional curvature of field, and a chromatic distortion tend to increase.

Therefore, in the image forming optical system according to the present invention, it is preferable that the lens component on the image side of the second lens group G2 for which, a height of off-axis chief ray is high is a cemented lens of the positive lens LA and the negative lens LB in order, and both air-contact surfaces of the lens component on the image side of the second lens group G2 have an aspheric shape which is deviated toward the image side with respect to a spherical surface of a respective radius of curvature on an optical axis, and when coordinate axes are let to be such that, an optical axial direction is z, and a direction perpendicular to the optical axis is h, R is let to be a radius of curvature on an optical axis of a spherical surface component, k is let to be a conical constant, and $A_4, A_6, A_8, A_{10}, \ldots$ are let to be aspherical coefficients, and when a shape of the aspheric surface is expressed by the following expression (5)

$$z = h^2/R/[1+\{1-(1+k)h^2/R^2\}^{1/2}] + A_4h^4 + A_6h^6 + A_8h^8 + A_{10}h^{10} + \quad (5), \text{ and}$$

when an amount of deviation is expressed by the following expression (6)

$$\Delta z = z - h^2/R/[1+\{1-h^2/R^2\}^{1/2}] \quad (6)$$

the image forming optical system satisfies the following conditional expression (7)

$$\Delta z_A(h) \leq 0, \Delta z_B(h) \leq 0 \text{(provided that } h=0.9a),$$

and $$-3.0e-4 \leq \{P(LA)-P(LB)\}/y_{10} \leq 2.0e-3 \text{(provided that } h=0.9a) \quad (7)$$

where $z_A$ is a shape of an air-contact surface of the positive lens LA, which is according to expression (5), $z_B$ is a shape of an air-contact surface of the negative lens LB, which is according to conditional expression (5), $z_c$ is a shape of the cemented surface, which is according to conditional expression (5), $\Delta z_A$ denotes an amount of deviation with respect to a spherical surface of a radius of curvature on the optical axis, of the air-contact surface of the positive lens LA, which is according to conditional expression (6), $\Delta z_B$ denotes an amount of deviation with respect to a spherical surface of a radius of curvature on the optical axis, of the air-contact surface of the positive lens LB, which is according to conditional expression (6), $\Delta z_c$ denotes an amount of deviation with respect to a spherical surface of a radius of curvature on the optical axis, of the cemented surface, which is according to conditional expression (6), vd(LA) denotes Abbe's number (ndA−1)/(nFA−nCA) for the d-line, of the positive lens LA, vd(LB) denotes Abbe's number (ndB−1)/(nFB−nCB) for the d-line, of the negative lens. LB, ndA, nCA, and nFA denote refractive indices of the positive lens LA, for the d-line, the C-line, and the F-line respectively, ndB, nCB, and nFB denote refractive indices of the negative lens LB, for the d-line, the C-line, and the F-line respectively, P(LA) is a parameter related to an aspheric surface and dispersion of the positive lens LA, and is expressed by the following expression $$P(LA)=(\Delta z_c(h)-\Delta z_A(h))/vd(LA),$$

P(LB) is a parameter related to an aspheric surface and dispersion of the negative lens LB, and is expressed by the following expression $$P(LB)=(\Delta z_c(h)-\Delta z_s(h))/vd(LB),$$

a is an amount according the following conditional expression (8)

$$a=(y_{10})^2 \cdot \log_{10}\gamma/\text{fw} \quad (8)$$

where, both the air-contact surfaces may be spherical surfaces, $y_{10}$ is a distance (the maximum image height) up to the farthest point from a center, in an effective image pickup surface (in a surface in which an image can be picked up) of an electronic image pickup apparatus which is disposed near an image forming position of the image forming optical system according to the present invention, fw is a focal length of the overall image forming optical system at a wide angle end, γ is a zooming ratio (a focal length of the overall image forming optical system at a telephoto end/a focal length of the overall image forming optical system at the wide angle end), and moreover, for letting an apex of each surface to be an origin point, z(0)=0 all the time.

Both air-contact surfaces which are aspheric surfaces are introduced basically with an object of correcting the coma aberration, the meridional curvature of field, and the distortion over high order related to a reference wavelength. However, inversely, sometimes aberrations other than for the reference wavelength are degraded.

Therefore, the contact surface is let to be an aspheric surface, and deterioration of aberrations for a wavelength other than the reference wavelength is corrected by satisfying conditional expression (7). When one of a lower limit value and an upper limit value of conditional expression (7) is surpassed, the coma aberration, the meridional curvature of field, and the distortion for each wavelength are susceptible to be degraded on the contrary.

It is more preferable that the image forming optical system according to the present invention satisfies the following conditional expression (7') instead of conditional expression (7).

$$+1.0e\text{-}6 \leq \{P(LA)-P(LB)\}/y_{10} \leq +1.0e\text{-}3 \text{(provided that } h=0.9a) \quad (7')$$

Furthermore, it is all the more preferable that the image forming optical system according to the present invention satisfies the following conditional expression (7") instead of conditional expression (7).

$$+1.0e\text{-}5 \leq \{P(LA)-P(LB)\}/y_{10} \leq +5.0e\text{-}4 \text{(provided that } h=0.9a) \quad (7'')$$

Moreover, smaller a difference between refractive indices as shown in conditional expression (9), it is easier to correct the aberrations for wavelengths other than these reference wavelengths without the coma aberration, the meridional curvature of field, and the distortion for the reference wavelength being degraded.

$$|\Delta nAB| < 0.18 \quad (9)$$

where,

ΔnAB denotes a difference between a refractive index for the d-line of a medium of the positive lens LA and a refractive index for the d-line of a medium of the negative lens LB.

When an upper limit value of conditional expression (9) is surpassed, it becomes difficult to correct the coma aberration, the meridional curvature of field, and the distortion for the reference wavelength, and the aberrations for the wavelengths other than the reference wavelength.

It is more preferable that the image forming optical system according to the present invention satisfies the following conditional expression (9') instead of conditional expression (9).

$$|\Delta nAB| < 0.15 \quad (9')$$

Furthermore, it is all the more preferable that the image forming optical system according to the present invention satisfies the following conditional expression (9") instead of conditional expression (9).

$$|\Delta nAB| < 0.11 \quad (9'')$$

It has been mentioned that when an optical designing is made with a condition of shortening the overall length or slimming when retraced, the refractive power of the second lens group G2 is to be increased to be large. For achieving the large refractive power, it is preferable that a refractive index n21 of a medium of a negative lens in a negative lens component L21 nearest to the object side in the second lens group G2 is let to satisfy the following conditional expression.

A reason for as to why it is preferable to let the negative lens component L21 nearest to the object side to be an object will be described below. Larger the refractive power of the second lens group G2, an aberration correction at a wide angle side becomes more difficult. However, for improving a possibility of correction, an arrangement of a refractive power which lowers the height of light rays within the second lens group G2 is preferable. In other words, it is for drawing a position of a principal point of the second lens group G2 as much toward the object side as possible.

$$n21 > 1.85 \quad (10)$$

When a lower limit value of conditional expression (10) is surpassed, the coma aberration, the meridional curvature of field, and the distortion particularly at the wide angle end side are susceptible to be degraded.

In the image forming optical system according to the present invention, letting the overall length of the image forming optical system at the wide angle end to be 0.75 times or less is advantageous for reducing a diameter of the first lens group or slimming including the aberration correction over an entire area of image plane at the telephoto end side and an off-axis at the wide angle end side in particular. Furthermore, it is more preferable to let the overall length of the image forming optical system at the wide angle end to be 0.7 times or less.

Moreover, letting an absolute value of a ratio of an amount of movement of the second lens group G2 to an amount of movement of the first lens group G1 at the time of zooming from the wide angle end to the telephoto end to be 0.4 or less is advantageous for reducing a diameter of the first lens group G1 or slimming including the aberration correction over the entire area of image plane of the telephoto end side and an off-axis of the wide angle end side in particular. Furthermore, it is more preferable to let the absolute value of the ratio of the amount of movement of the second lens group G2 to the amount of movement of the first lens group G1 at the time of zooming from the wide angle end to the telephoto end to be 0.3 or less.

Moreover, letting an absolute value of a combined focal length of the second lens group G2 to a combined focal length of the first lens group G1 to be 0.25 or less is advantageous for reducing the diameter of the first lens group G1 or slimming including the aberration correction over the entire area of image plane at the telephoto end side and an off-axis at the wide angle end side in particular. Furthermore, it is more preferable to let the absolute value of the combined focal length of the second lens group G2 to the combined focal length of the first lens G1 to be 0.20 or less.

Moving of the second lens group G2 such that the second lens group G2 is positioned more toward the image side than at the wide angle end when the focal length of the overall image forming system at the time of zooming is in a range of 1.2 fw to 1.8 fw is advantageous for reducing the diameter of the first lens group G1 or slimming including the aberration correction over the entire area of image plane at the telephoto end side and an off-axis at the wide angle end side in particular.

Moreover, moving of the third lens group G3 only toward the object side at the time of zooming from the wide angle end to the telephoto end is advantageous for reducing the diameter of the first lens group or slimming including the aberration correction over the entire area of image plane at the telephoto end side and an off-axis at the wide angle end side in particular.

By moving of the fourth lens group G4 such that the fourth lens group G4 is positioned more toward the image side at the telephoto end that at the wide angle end, it is possible to reduce an effect of an increase in zooming of the third lens group G3, and it is advantageous for reducing a change in the aberration at the time of zooming.

(Effect)

By using the present invention, it is possible to achieve an image forming optical system with a favorable optical performance, having specifications of a zooming ratio of about five to seven times, and an angle of field at the wide angle end of about 75 degrees with the same overall length as of an optical system of an image forming optical system of a class of three-times (3×) zooming according to a conventional technology.

(Embodiments)

Eight exemplary embodiments of a zooming optical system will be described below. In a first embodiment and a second embodiment, zooming optical systems of a zoom ratio of about five times, a half angle of field at the wide angle end of about 37 degrees, and the overall length of the optical system at the telephoto end of 4.9 times or less for an assured image-circle diameter (twice of maximum image height) have been realized. Moreover, in embodiments from a third embodiment to an eighth embodiment, zooming optical systems of a zoom ratio of about seven times, a half angle of field at the wide angle end of about 37 degrees, and the overall length of the optical system at the telephoto end of 5.7 times or less for an assured image-circle diameter (twice of maximum image height) have been realized.

Figure 1B:
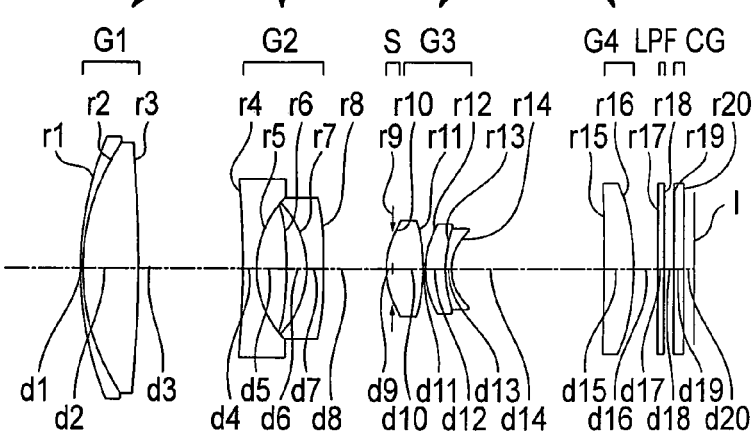
Figure 1C:
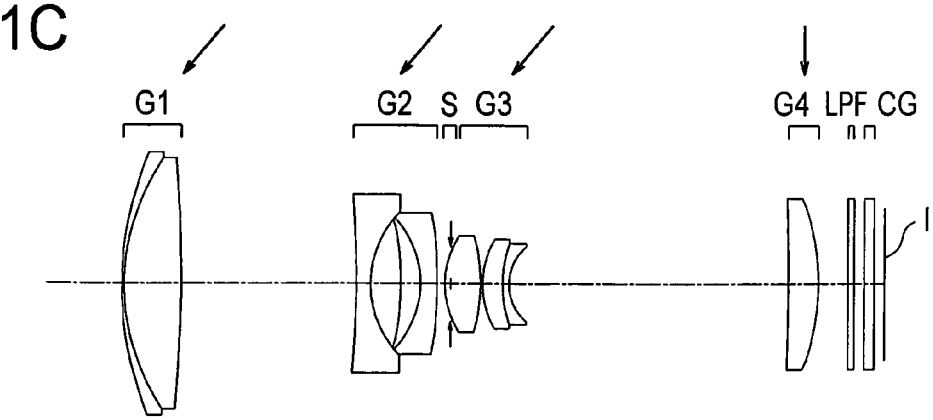

A zoom lens according to the first embodiment will be described below. FIG. 1A, FIG. 1B, and FIG. 1C are cross-sectional views along an optical axis showing an optical arrangement at the time of infinite object point focusing of a zoom lens according to the first embodiment of the present invention, where, FIG. 1A shows a state at a wide angle end, FIG. 1B shows an intermediate focal length state, and FIG. 1C shows a state at a telephoto end.

Figure 2A:
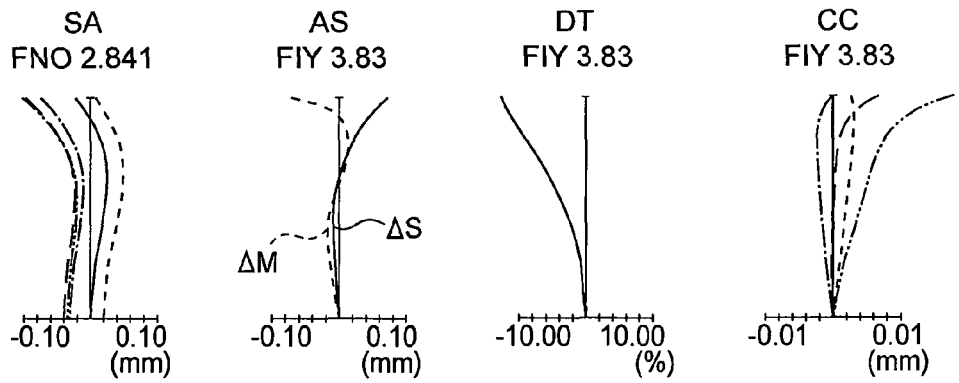
FIG. 2A, FIG. 2B, and FIG. 2C are diagrams showing a spherical aberration, an astigmatism, a distortion, and a chromatic aberration of magnification at the time of infinite object point focusing of the zoom lens according to the first embodiment, where.
Figure 2B:
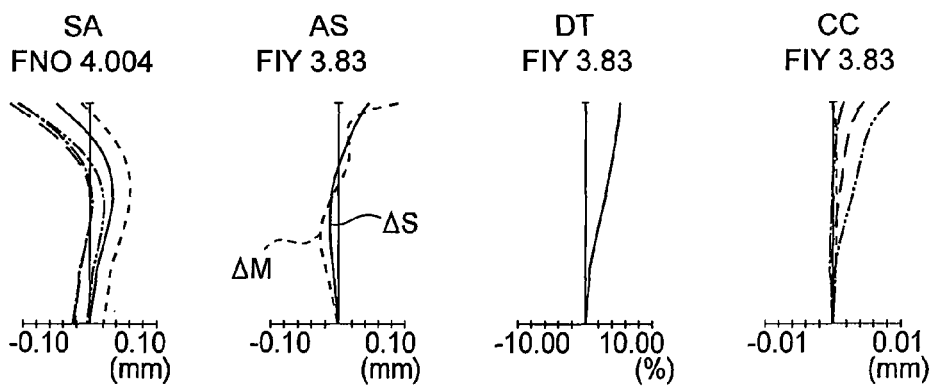
Figure 2C:
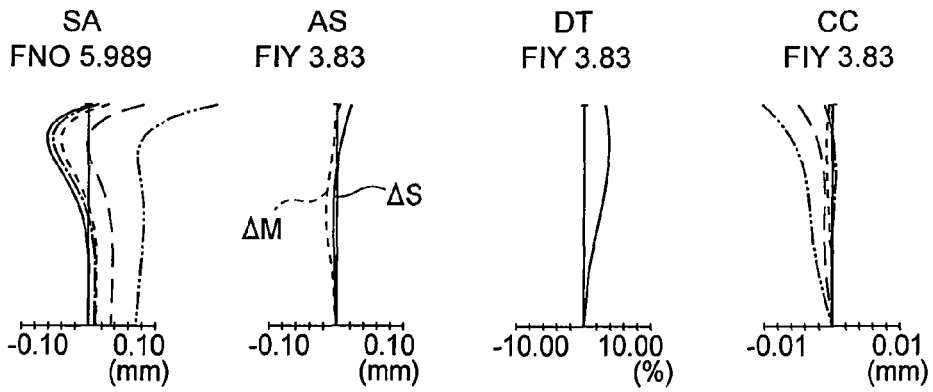

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens according to the first embodiment, where, FIG. 2A shows a state at the wide angle end, FIG. 2B shows an intermediate focal length state, and FIG. 2C shows a state at the telephoto end. Moreover, FIY denotes an image height. Symbols in aberration diagrams are same in the embodiments which will be described later.

The zoom lens according to the first embodiment, as shown in FIG. 1A, FIG. 1B, and FIG. 1C, includes in order from an object side, a first lens group G1 having a positive refractive power, a second lens group G2 having a negative refractive power, an aperture stop S, a third lens group G3 having a positive refractive power, and a fourth lens group G4 having a positive refractive power. In all the embodiments which will be described below, in the lens cross-sectional views, LPF denotes a low pass filter, CG denotes a cover glass, and I denotes an image pickup surface of an electronic image pickup element.

The first lens group G1 includes a cemented lens of a negative meniscus lens L1 having a convex surface directed toward the object side and a biconvex positive lens L2, from the object side, and has a positive refractive power as a whole.

The meniscus lens L1 corresponds to the lens LC according to the present invention and the positive lens L2 corresponds to the lens LD according to the present invention.

The second lens group G2 includes in order from an object side, a biconcave negative lens L3, and a cemented lens of a positive meniscus lens L4 having a convex surfaced directed toward an image side and a negative meniscus lens L5 having a convex surface directed toward the image side, and has a negative refractive power as a whole.

The meniscus lens L4 corresponds to the lens LA according to the present invention, and the meniscus lens L5 corresponds to the lens LB according to the present invention.

The third lens group G3 includes a biconvex positive lens L6, and a cemented lens of a positive meniscus lens L7 having a convex surface directed toward the object side and a negative meniscus lens L8 having a convex surface directed toward the object side, and has a positive refractive power as a whole.

The fourth lens group G4 includes a positive meniscus lens L9 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4, upon moving toward the image side, is turned over, and moves toward the object side.

An aspheric surface is provided to nine surfaces namely, both surfaces of the negative meniscus lens L1 and a surface on the object side of the biconvex positive lens L2 in the first lens group G1, both surfaces of the positive meniscus lens L4 and a surface on the image side of the negative meniscus lens L5 in the second lens group G2, both surfaces of the biconvex positive lens L6 in the third lens group G3, and a surface on the image side of the positive meniscus lens L9 in the fourth lens group G4.

Figure 3A:
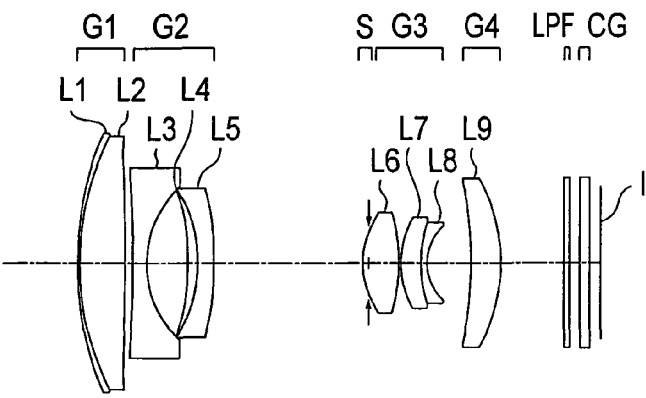
FIG. 3A, FIG. 3B, and FIG. 3C are cross-sectional views along an optical axis showing an optical arrangement at the time of infinite object point focusing of a zoom lens according to a second embodiment of the present invention, where.
Figure 3B:
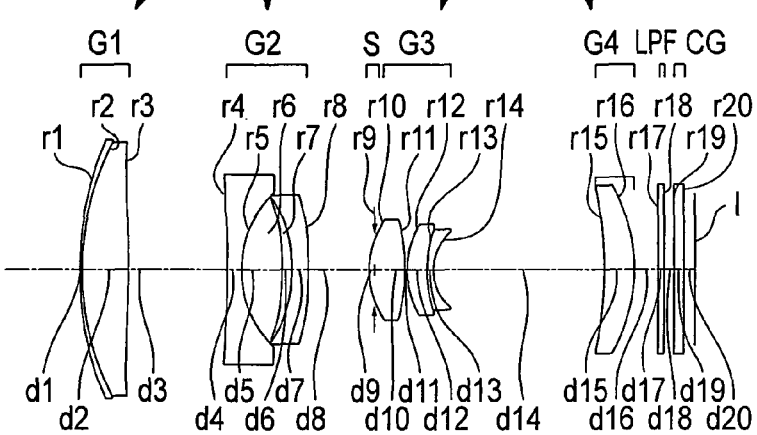
Figure 3C:
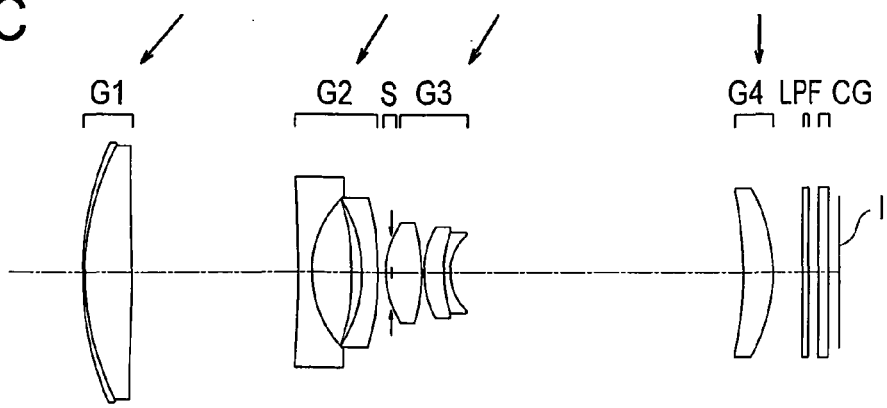

Next, a zoom lens according to the second embodiment of the present invention will be described below. FIG. 3A, FIG. 3B, and FIG. 3C are cross-sectional views along an optical axis showing an optical arrangement at the time of infinite object point focusing of a zoom lens according to the second embodiment of the present invention, where, FIG. 3A shows a state at a wide angle end, FIG. 3B shows an intermediate state, and FIG. 3C shows a state at a telephoto end.

Figure 4A:
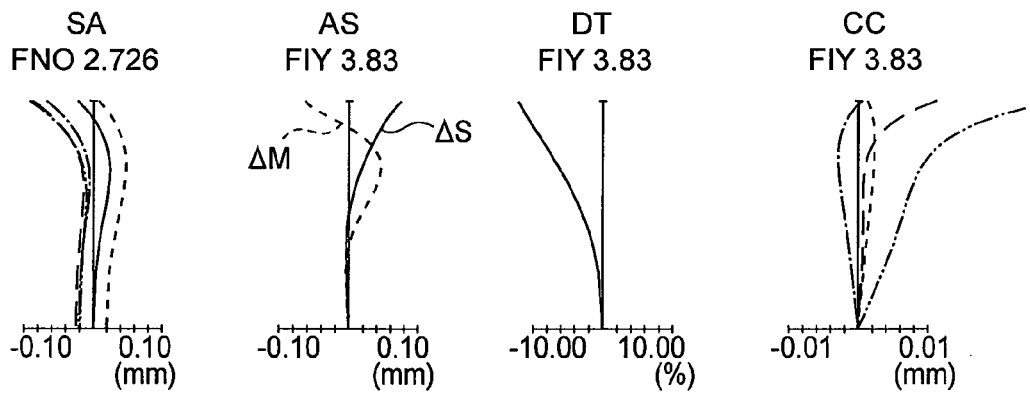
FIG. 4A, FIG. 4B and FIG. 4C are diagrams showing a spherical aberration, an astigmatism, a distortion, and a chromatic aberration of magnification at the time of infinite object point focusing of the zoom lens according to the second embodiment, where.
Figure 4B:
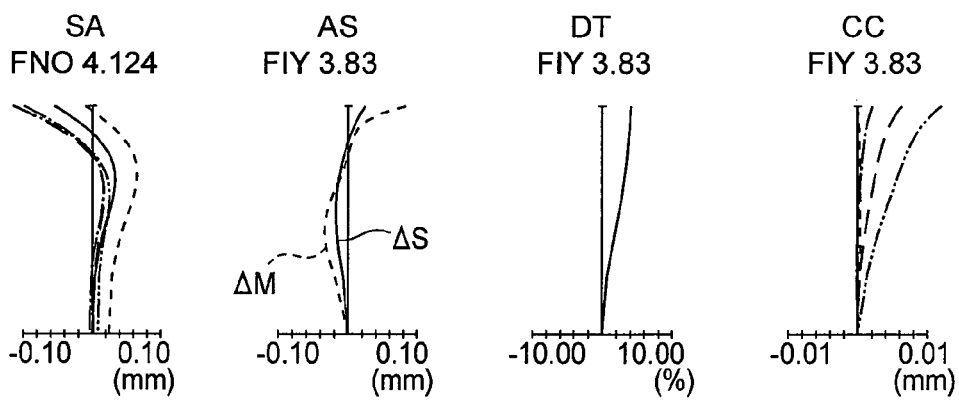
Figure 4C:
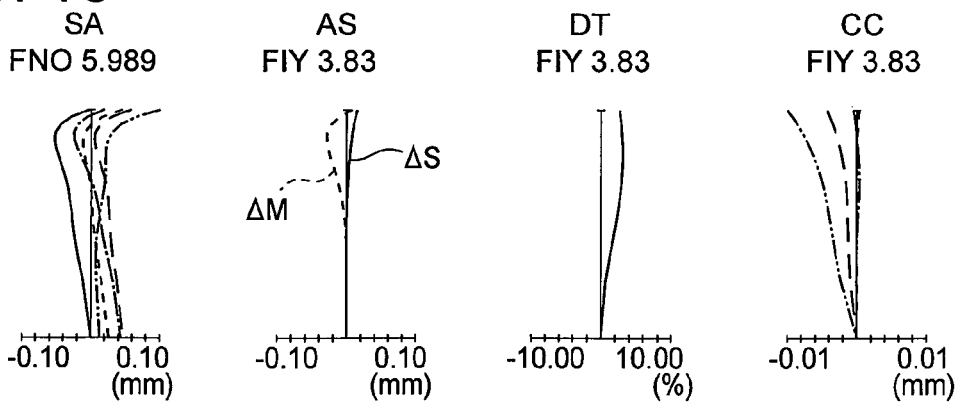

FIG. 4A, FIG. 4B, and FIG. 4C are diagrams showing a spherical aberration (SA), an astigmatism (AS), a distortion (DT), and a chromatic aberration of magnification (CC) at the time of infinite object point focusing of the zoom lens according to the second embodiment, where, FIG. 4A shows a state at the wide angle end, FIG. 4B shows an intermediate focal length state, and FIG. 4C shows a state at the telephoto end.

The zoom lens according to the second embodiment, as shown in FIG. 3A, FIG. 3B, and FIG. 3C, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The first lens group G1 includes a cemented lens of a negative meniscus lens L1 having a convex surface directed toward the object side and a biconvex positive lens L2, in order from the object side, and has a positive refractive power as a whole.

The meniscus lens L1 corresponds to the lens LC according to the present invention, and the positive lens corresponds to the lens LD according to the present invention.

The second lens group G2 includes in order from the object side, a biconcave negative lens L3, and a cemented lens of a positive meniscus lens L4 having a convex surface directed toward an image side and a negative meniscus lens L5 having a convex surface directed toward the image side, and has a negative refractive power as a whole.

The meniscus lens L4 corresponds to the lens LA according to the present invention, and a negative meniscus lens L5 corresponds to the lens LB according to the present invention.

The third lens group G3 includes a biconvex positive lens L6, and a cemented lens of a positive meniscus lens L7 having a convex surface directed toward the object side and a negative meniscus lens L8 having a convex surface directed toward the object side, and has a positive refractive power as a whole.

The fourth lens group G4 includes a positive meniscus lens L9 having a convex surface directed toward the image side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4, upon moving toward the image side, is turned over, and moves toward the object side.

An aspheric surface is provided to nine surfaces namely, both surfaces of the negative meniscus lens L1 and a surface on the image side of the biconvex positive lens L2 in the first lens group G1, both surfaces of the positive meniscus lens L4 and a surface on the image side of the negative meniscus lens L5 in the second lens group G2, both surfaces of the biconvex positive lens L6 in the third lens group G3, and a surface on the image side of the positive meniscus lens L9 in the fourth lens group G4.

Figure 5A:
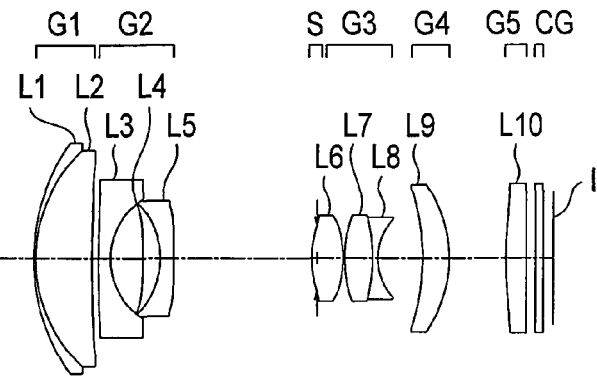
FIG. 5A, FIG. 5B, and FIG. 5C are cross-sectional views along an optical axis showing an optical arrangement at the time of infinite object point focusing of a zoom lens according to a third embodiment of the present invention, where.
Figure 5B:
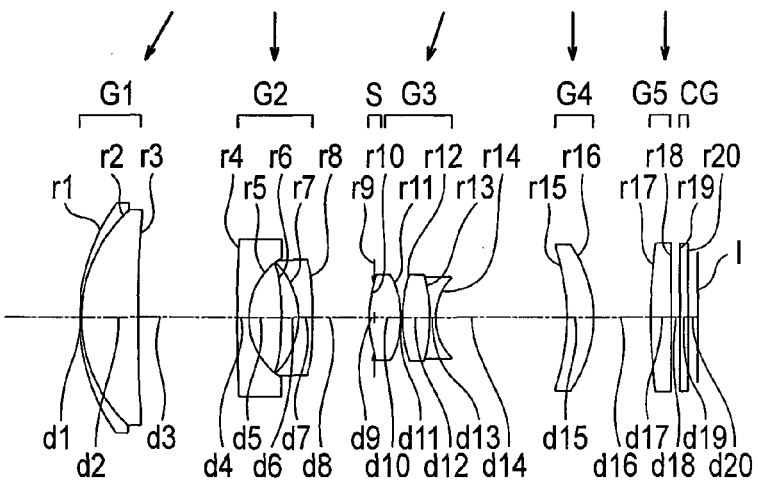
Figure 5C:
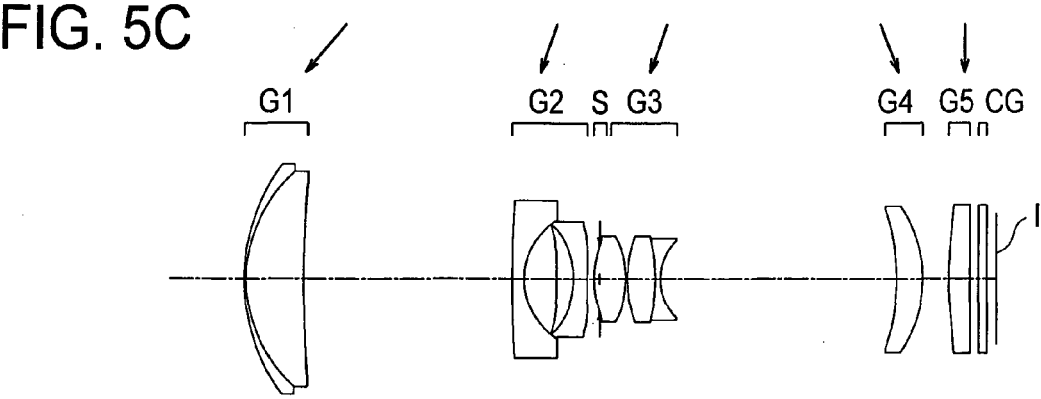

Next, a zoom lens according to the third embodiment of the present invention will be described below. FIG. 5A, FIG. 5B, and FIG. 5C are cross-sectional views along an optical axis showing an optical arrangement at the time of infinite object point focusing of the zoom lens according to the third embodiment of the present invention, where, FIG. 5A shows a state at a wide angle end, FIG. 5B shows an intermediate focal length state, and FIG. 5C shows a state at a telephoto end.

Figure 6A:
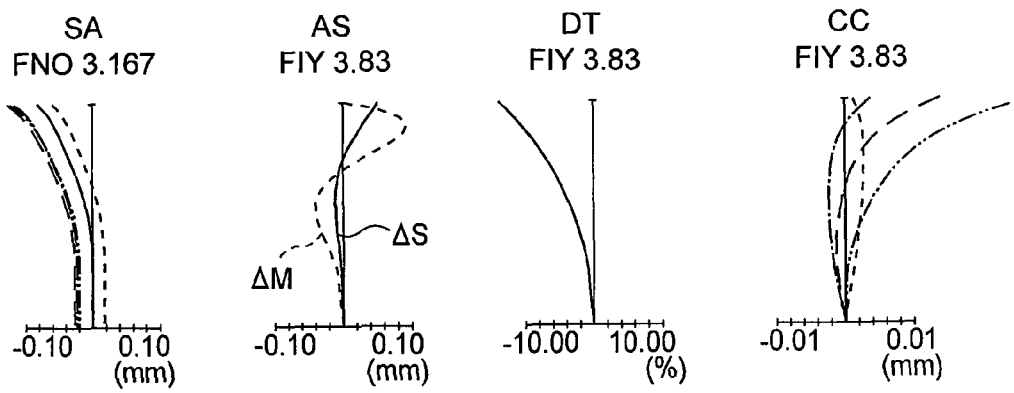
FIG. 6A, FIG. 6B, and FIG. 6C are diagrams showing a spherical aberration, an astigmatism, a distortion, and a chromatic aberration of magnification at the time of infinite object point focusing of the zoom lens according to the third embodiment, where.
Figure 6B:
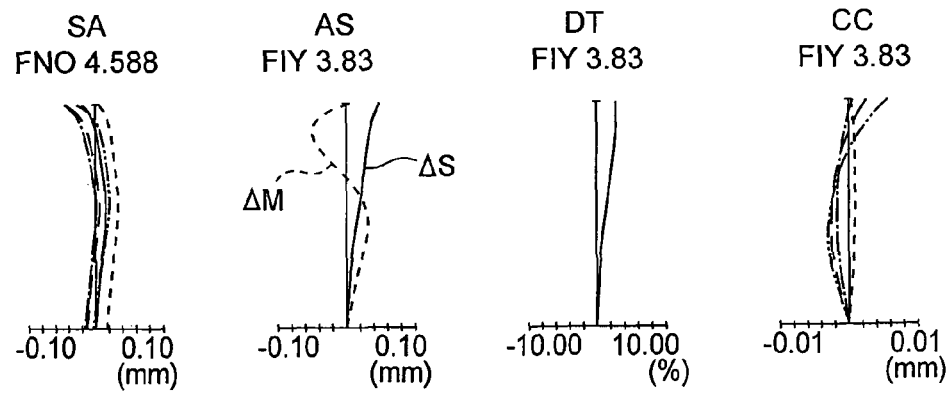
Figure 6C:
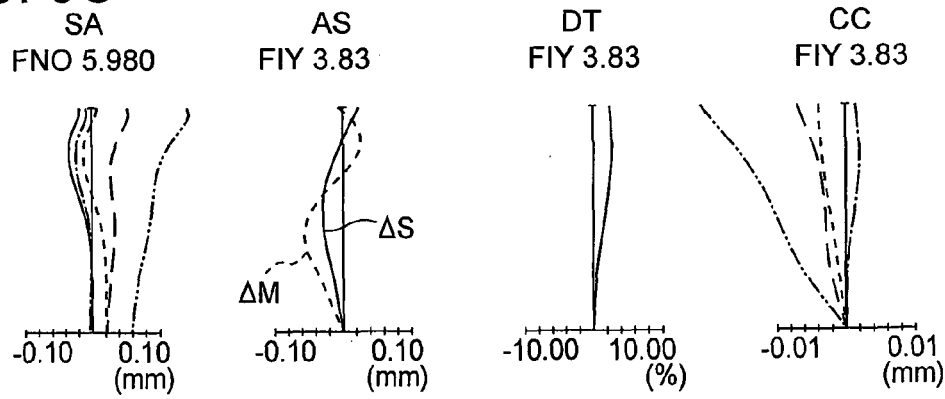

FIG. 6A, FIG. 6B, and FIG. 6C are diagrams showing a spherical aberration (SA), an astigmatism (AS), a distortion (DT), and a chromatic aberration of magnification (CC) at the time of infinite object point focusing of the zoom lens according to the third embodiment, where, FIG. 6A shows a state at the wide angle end, FIG. 6B shows an intermediate focal length state, and FIG. 6C shows a state at the telephoto end.

The zoom lens according to the third embodiment, as shown in FIG. 5A, FIG. 5B, and FIG. 5C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes a cemented lens of a negative meniscus lens L1 having a convex surface directed toward the object side and a biconvex positive lens L2, in order from the object side.

The meniscus lens L1 corresponds to the lens LC according to the present invention, and the positive lens L2 corresponds to the lens LD according to the present invention.

The second lens group G2 includes in order from the object side, a negative meniscus lens L3 having a convex surface directed toward the object side, and a cemented lens of a positive meniscus lens L4 having a convex surface directed toward an image side and a biconcave negative lens L5, and has a negative refractive power as a whole.

The meniscus lens L4 corresponds to the lens LA according to the present invention, and the biconcave negative lens L5 corresponds to the lens LB according to the present invention.

The third lens group G3 includes a biconvex positive lens L6, and a cemented lens of a biconvex positive lens L7 and a biconcave negative lens L8, and has a positive refractive power as a whole.

The fourth lens group G4 includes a positive meniscus lens L9 having a convex surface directed toward the image side, and has a positive refractive power as a whole.

The fifth lens group G5 includes a planoconvex positive lens L10 having a convex surface directed toward the object side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the image side, particularly, from the intermediate focal length state up to the telephoto end. The fifth lens group G5 is substantially fixed with respect to an image position.

An aspheric surface is provided to nine surfaces namely, both surfaces of the negative meniscus lens L1 and a surface on the image side of the biconvex positive lens L2 in the first lens group G1, both surfaces of the positive meniscus lens L4 and a surface on the image side of the biconcave negative lens L5 in the second lens group G2, both surfaces of the biconvex positive lens L6 in the third lens group G3, and a surface on the object side of the planoconvex positive lens L10 in the fifth lens group G5.

Figure 7A:
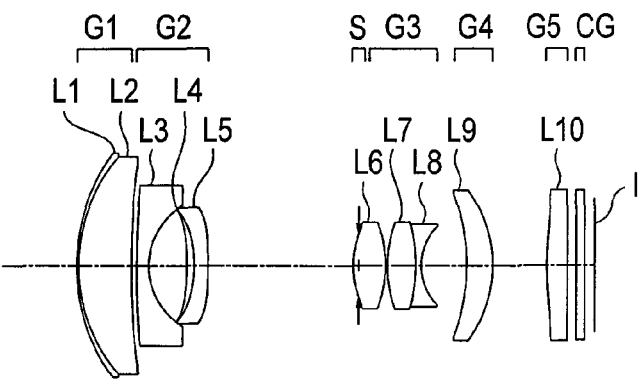
FIG. 7A, FIG. 7B, and FIG. 7C are cross-sectional views along an optical axis showing an optical arrangement at the time of infinite object point focusing of a zoom lens according to a fourth embodiment of the present invention, where.
Figure 7B:
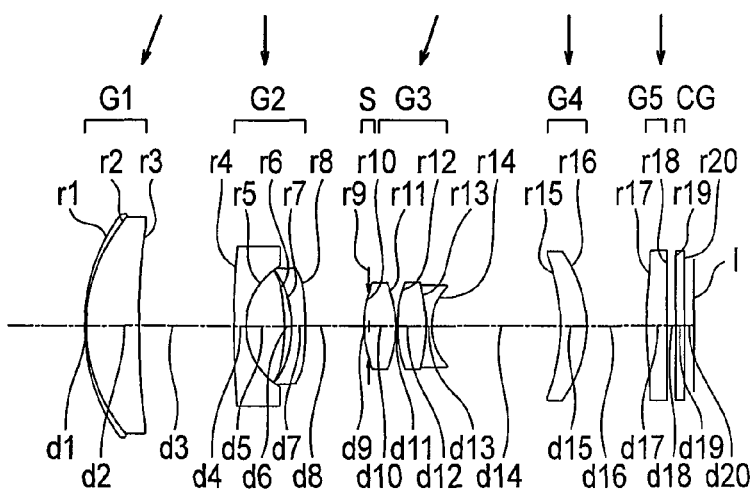
Figure 7C:
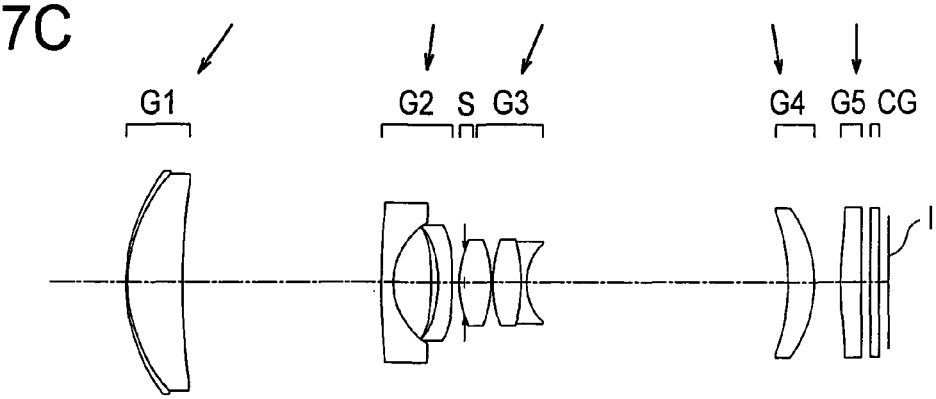

Next, a zoom lens according to the fourth embodiment of the present invention will be described below. FIG. 7A, FIG. 7B, and FIG. 7C are cross-sectional views along an optical axis showing an optical arrangement at the time of infinite object point focusing of a zoom lens according to the fourth embodiment of the present invention, where, FIG. 7A shows a state at a wide angle end, FIG. 7B shows an intermediate focal length state, and FIG. 7C shows a state at a telephoto end.

Figure 8A:
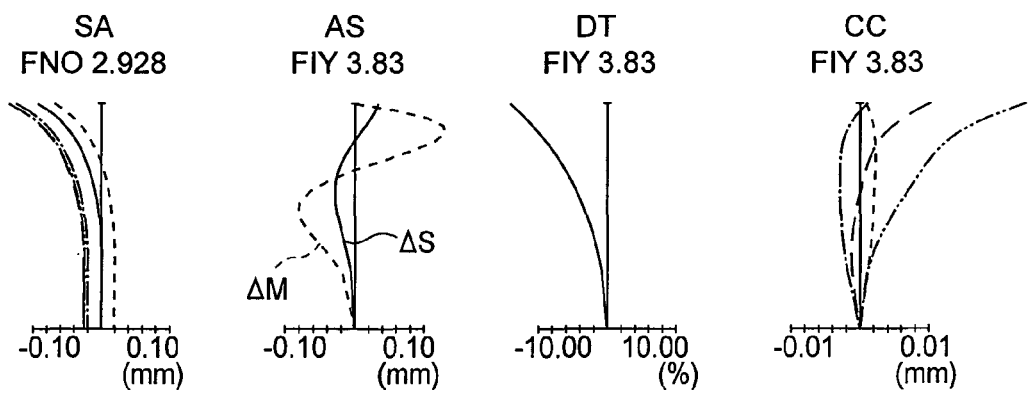
FIG. 8A, FIG. 8B, and FIG. 8C are diagrams showing a spherical aberration, an astigmatism, a distortion, and a chromatic aberration of magnification at the time of infinite object point focusing of the zoom lens according to the fourth embodiment, where.
Figure 8B:
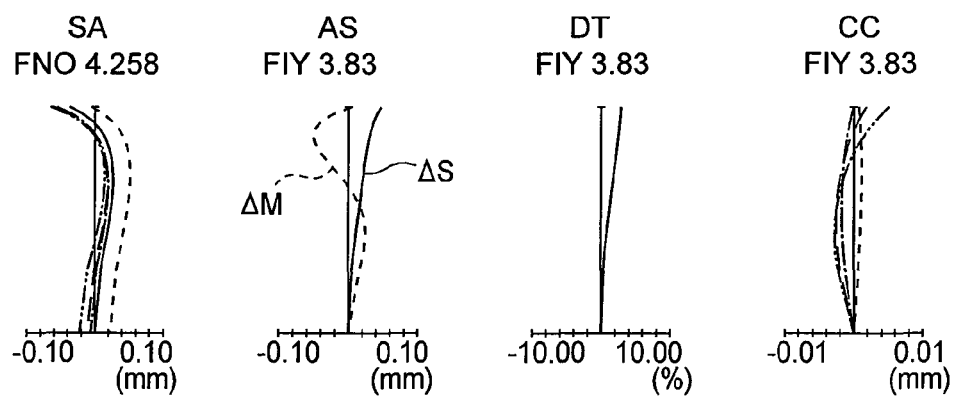
Figure 8C:
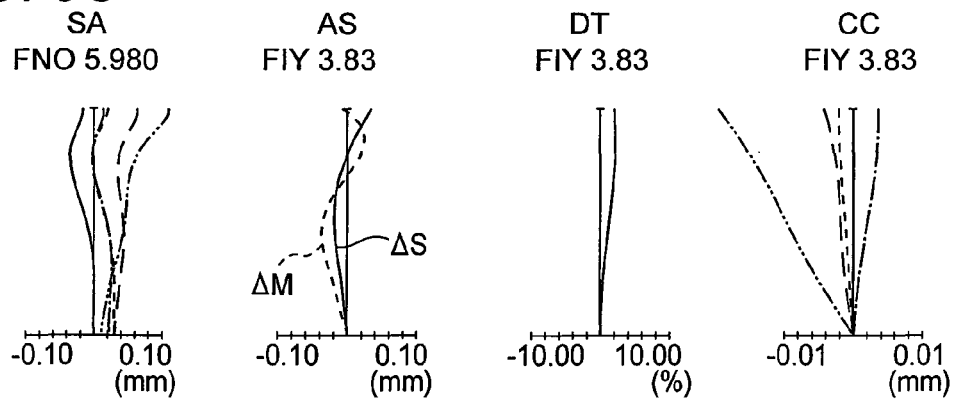

FIG. 8A, FIG. 8B, and FIG. 8C are diagrams showing a spherical aberration (SA), an astigmatism (AS), a distortion (DT), and a chromatic aberration of magnification (CC) at the time of infinite object point focusing of the zoom lens according to the fourth embodiment, where, FIG. 8A shows a state at the wide angle end, FIG. 8B shows an intermediate focal length state, and FIG. 8C shows a state at the telephoto end.

The zoom lens according to the fourth embodiment, as shown in FIG. 7A, FIG. 7B, and FIG. 7C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes a cemented lens of a negative meniscus lens L1 having a convex surface directed toward the object side and a positive meniscus lens L2 having a convex surface directed toward the object side, in order from the object side, and has a positive refractive power as a whole.

The meniscus lens L1 corresponds to the lens LC according to the present invention, and the meniscus lens L2 corresponds to the lens LD according to the present invention.

The second lens group G2 includes in order from the object side, a negative meniscus lens L3 having a convex surface directed toward the object side, and a cemented lens of a positive meniscus lens L4 having a convex surface directed toward an image side and a negative meniscus lens L5 having a convex surface directed toward the image side, and has a negative refractive power as a whole.

The meniscus lens L4 corresponds to the lens LA according to the present invention, and the meniscus lens L5 corresponds to the lens LB according to the present invention.

The third lens group G3 includes a biconvex positive lens L6, and a cemented lens of a biconvex positive lens L7 and a biconcave negative lens L8, and has a positive refractive power as a whole.

The fourth lens group G4 includes a positive meniscus lens L9 having a convex surface directed toward the image side, and has a positive refractive power as a whole.

The fifth lens group G5 includes a planoconvex positive lens L10 having a convex surface directed toward the object side, and has a positive refractive power as a whole.

At the time of zooming form the wide angle end to the telephoto end, the first lens group G1 moves toward the object side. The second lens group G2 moves toward the object side. The third lens group G3 moves toward the object side. The fourth lens group G4 moves toward the image side, particularly, from the intermediate focal length state up to the telephoto end. The fifth lens group G5 is substantially fixed with respect to an image position.

An aspheric surface is provided to nine surfaces namely, both surfaces of the negative meniscus lens L1 and a surface on the image side of the positive meniscus lens L2 in the first lens group G1, both surfaces of the positive meniscus lens L4 and a surface on the image side of the negative meniscus lens L5 in the second lens group G2, both surfaces of the biconvex positive lens L6 in the third lens group G3, and a surface on the object side of the planoconvex positive lens L10 in the fifth lens group G5.

Figure 9A:
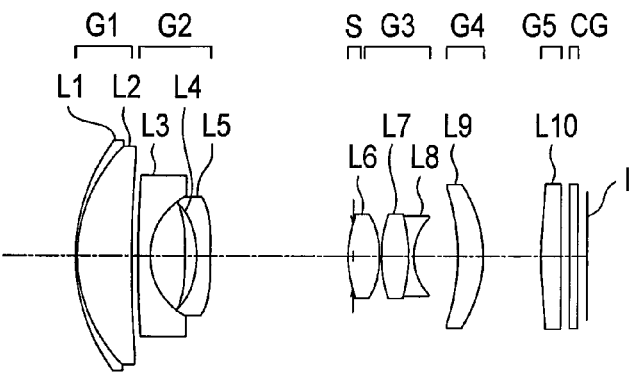
FIG. 9A, FIG. 9B, and FIG. 9C are cross-sectional views along an optical axis showing an optical arrangement at the time of infinite object point focusing of a zoom lens according to a fifth embodiment of the present invention, where.
Figure 9B:
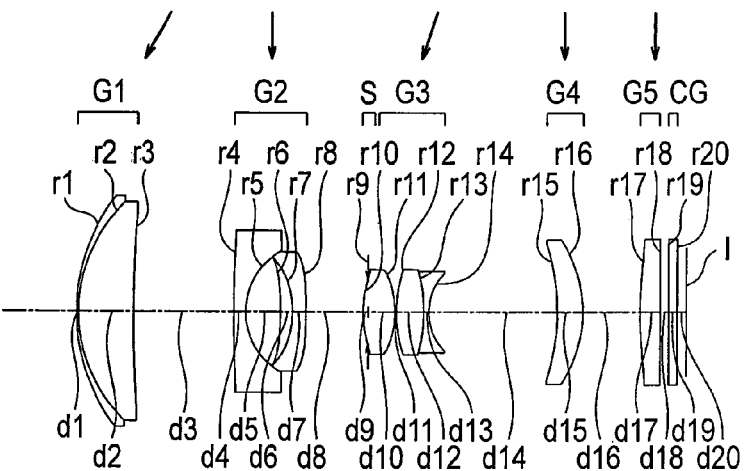
Figure 9C:
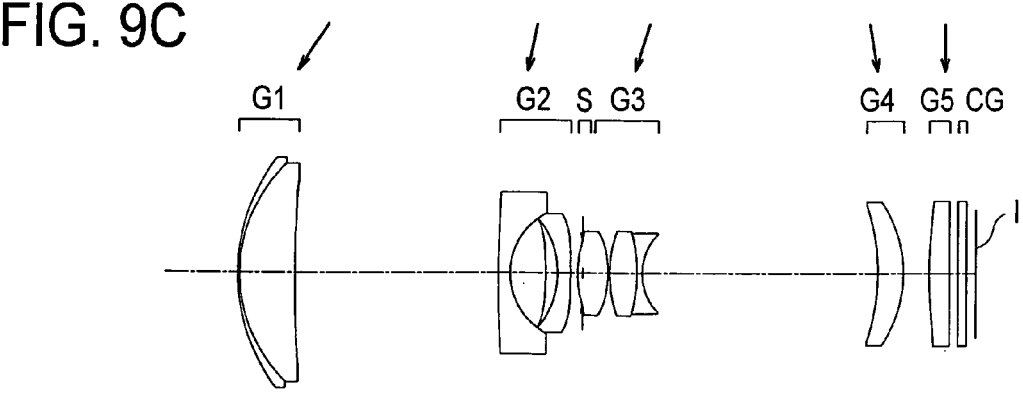

Next, a zoom lens according to the fifth embodiment of the present invention will be described below. FIG. 9A, FIG. 9B, and FIG. 9C are cross-sectional views along an optical axis showing an optical arrangement at the time of infinite object point focusing of the zoom lens according to the fifth embodiment of the present invention, where, FIG. 9A shows a state at a wide angle end, FIG. 9B shows an intermediate focal length state, and FIG. 9C shows a state at a telephoto end.

Figure 10A:
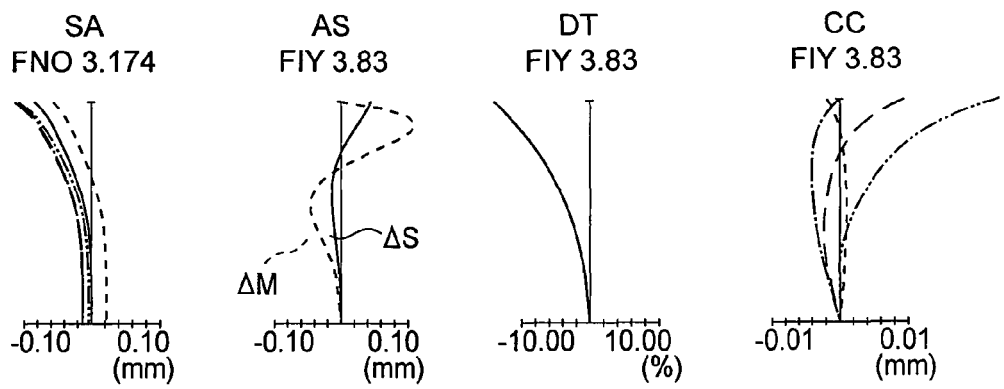
Figure 10B:
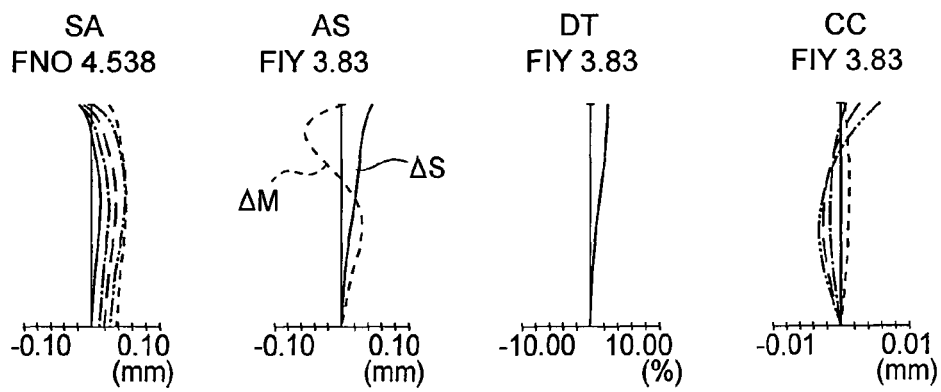
Figure 10C:
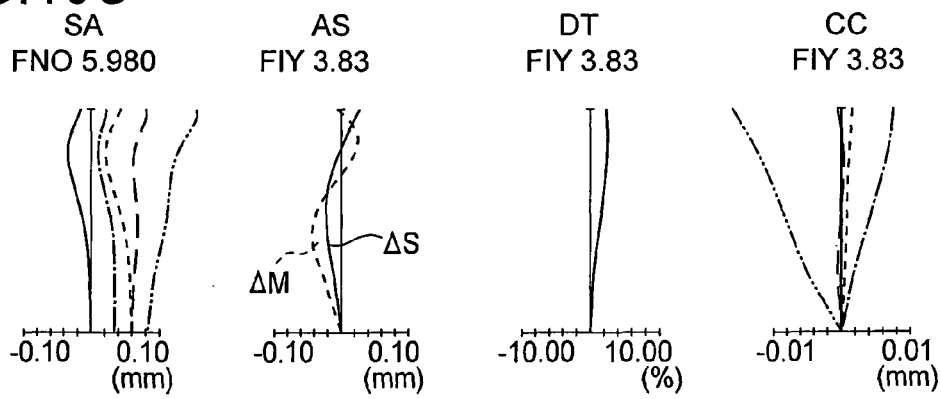
FIG. 10C shows a state at the telephoto end.

FIG. 10A, FIG. 10B, and FIG. 10C are diagrams showing a spherical aberration (SA), an astigmatism (AS), a distortion (DT), and a chromatic aberration of magnification (CC) at the time of infinite object point focusing of the zoom lens according to the fifth embodiment, where, FIG. 10A shows a state at the wide angle end, FIG. 10B shows an intermediate focal length state, and FIG. 10C shows a state at the telephoto end.

The zoom lens according to the fifth embodiment, as shown in FIG. 9A, FIG. 9B, and FIG. 9C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes a cemented lens of a negative meniscus lens L1 having a convex surface directed toward the object side and a positive meniscus lens L2 having a convex surface directed toward the object side, in order from the object side, and has a positive refractive power as a whole.

The meniscus lens L1 corresponds to the lens LC according to the present invention, and the meniscus lens L2 corresponds to the lens LD according to the present invention.

The second lens group G2 includes in order from the object side, a negative meniscus lens L3 having a convex surface directed toward the object side, and a cemented lens of a positive meniscus lens L4 having a convex surface directed toward an image side and a negative meniscus lens L5 having a convex surface directed toward the image side, and has a negative refractive power as a whole.

The meniscus lens L4 corresponds to the lens LA according to the present invention, and the meniscus lens L5 corresponds to the lens LB according to the present invention.

The third lens group G3 includes a biconvex positive lens L6, and a cemented lens of a biconvex positive lens L7 and a biconcave negative lens L8, and has a positive refractive power as a whole.

The fourth lens group G4 includes a positive meniscus lens L9 having a convex surface directed toward the image side, and has a positive refractive power as a whole.

The fifth lens group G5 includes a planoconvex positive lens L10 having a convex surface directed toward the object side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the image side, particularly, from the intermediate focal length state up to the telephoto end. The fifth lens group G5 is substantially fixed with respect to an image position.

An aspheric surface is provided to nine surfaces namely, both surfaces of the negative meniscus lens L1 and a surface on the image side of the positive meniscus lens L2 in the first lens group G1, both surfaces of the positive meniscus lens L4 and a surface on the image side of the negative meniscus lens L5 in the second lens group G2, both surfaces of the biconvex positive lens L6 in the third lens group G3, and a surface on the object side of the planoconvex positive lens L10 in the fifth lens group G5.

Figure 11A:
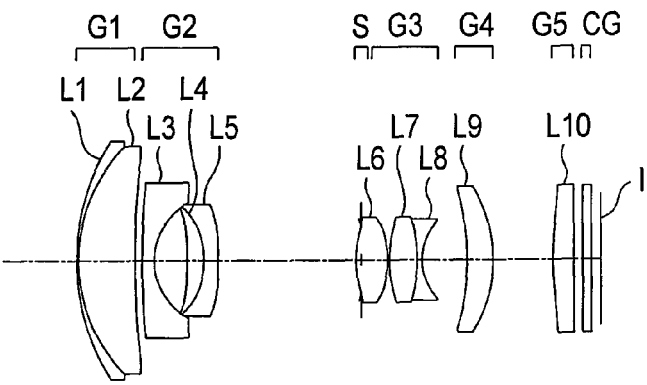
FIG. 11A, FIG. 11B, FIG. 11C are cross-sectional views along an optical axis showing an optical arrangement at the time of infinite object point focusing of a zoom lens according to a sixth embodiment of the present invention, where.
Figure 11B:
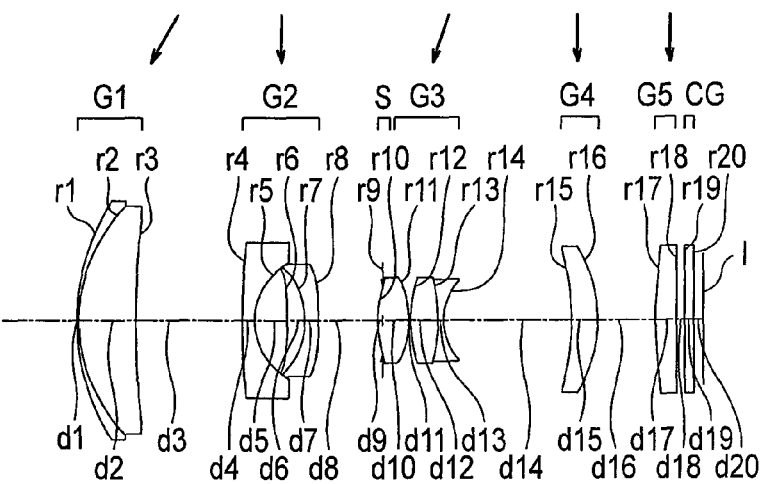
Figure 11C:
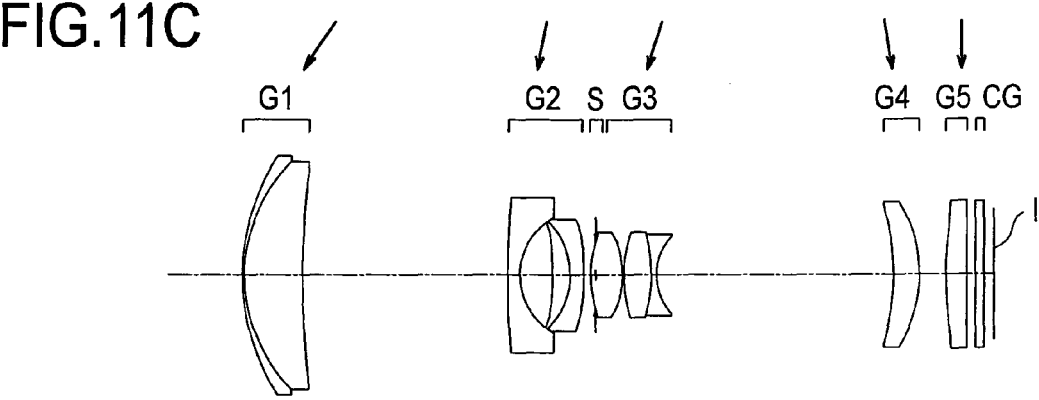

Next, a zoom lens according to the sixth embodiment of the present invention will be described below. FIG. 11A, FIG. 11B, and FIG. 11C are cross-sectional views along an optical axis showing an optical arrangement at the time of infinite object point focusing of the zoom lens according to the sixth embodiment of the present invention, where, FIG. 11A shows a state at a wide angle end, FIG. 11B shows an intermediate focal length state, and FIG. 11C shows a state at a telephoto end.

Figure 12A:
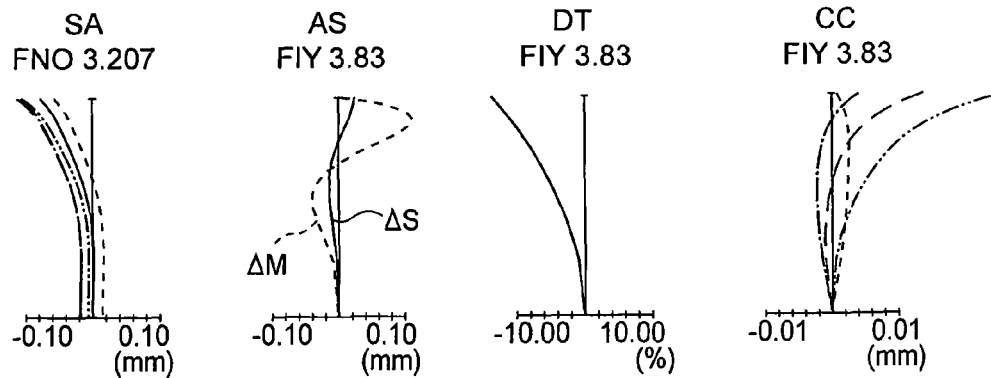
FIG. 12A, FIG. 12B, and FIG. 12C are diagrams showing a spherical aberration, an astigmatism, a distortion, and a chromatic aberration of magnification at the time of infinite object point focusing of the zoom lens according to the sixth embodiment, where.
Figure 12B:
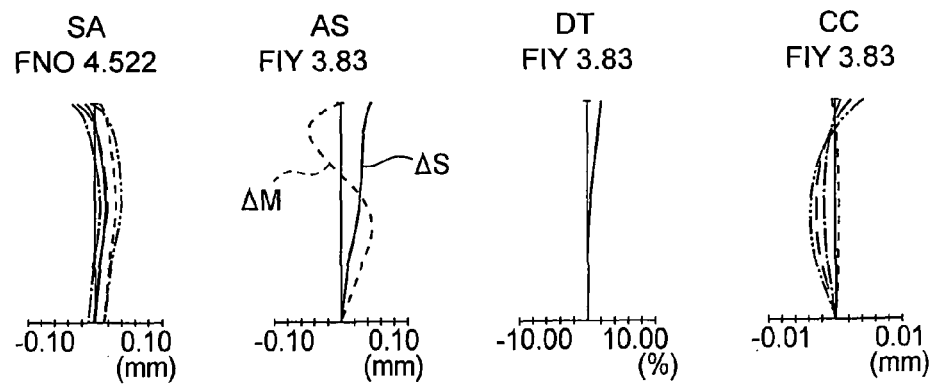
Figure 12C:
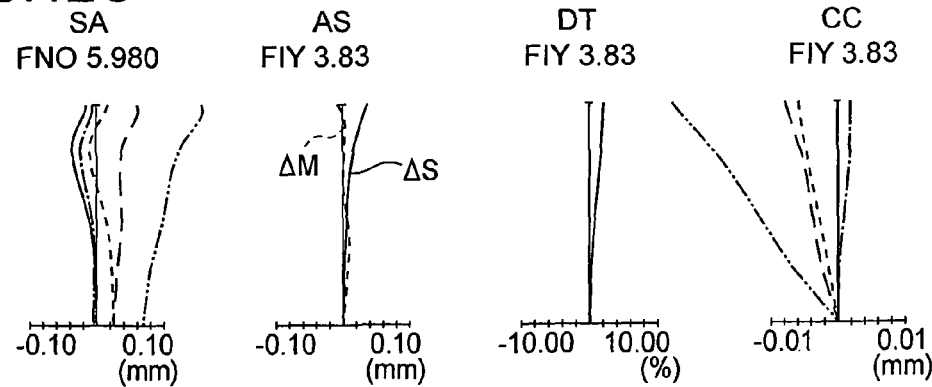

FIG. 12A, FIG. 12B, and FIG. 12C are diagrams showing a spherical aberration (SA), an astigmatism (AS), a distortion (DT), and a chromatic aberration of magnification (CC) at the time of infinite object point focusing of the zoom lens according to the sixth embodiment, where, FIG. 12A shows a state at the wide angle end, FIG. 12B shows an intermediate focal length state, and FIG. 12C shows a state at the telephoto end.

The zoom lens according to the sixth embodiment, as shown in FIG. 11A, FIG. 11B, and FIG. 11C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes a cemented lens of a negative meniscus lens L1 having a convex surface directed toward the object side and a positive meniscus lens L2 having a convex surface directed toward the object side, in order from the object side, and has a positive refractive power as a whole.

The meniscus lens L1 corresponds to the lens LC according to the present invention, and the meniscus lens L2 corresponds to the lens LD according to the present invention.

The second lens group G2 includes in order from the object side, a negative meniscus lens L3 having a convex surface directed toward the object side, and a cemented lens of a positive meniscus lens L4 having a convex surface directed toward an image side and a negative meniscus lens L5 having a convex surface directed toward the image side, and has a negative refractive power as a whole.

The meniscus lens L4 corresponds to the lens LA according to the present invention, and the meniscus lens L5 corresponds to the lens LB according to the present invention.

The third lens group G3 includes a biconvex positive lens L6, and a cemented lens of a biconvex positive lens L7 and a biconcave negative lens L8, and has a positive refractive power as a whole.

The fourth lens group G4 includes a positive meniscus lens L9 having a convex surface directed toward the image side, and has a positive refractive power as a whole.

The fifth lens group G5 includes a planoconvex positive lens L10 having a convex surface directed toward the object side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the image side, particularly, from the intermediate focal length state up to the telephoto end. The fifth lens group G5 is substantially fixed with respect to an image position.

An aspheric surface is provided to nine surfaces namely, both surfaces of the negative meniscus lens L1 and a surface on the image side of the positive meniscus lens L2 in the first lens group G1, both surfaces of the positive meniscus lens L4 and a surface on the image side of the negative meniscus lens L5 in the second lens group G2, both surfaces of the biconvex positive lens L6 in the third lens group G3, and a surface on the object side of the planoconvex positive lens L10 in the fifth lens group G5.

Figure 13A:
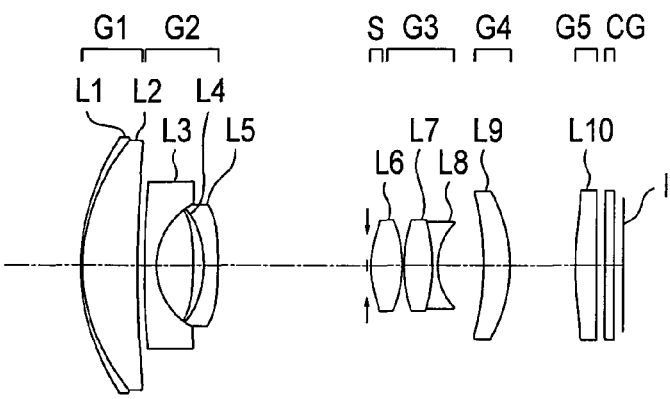
FIG. 13A, FIG. 13B, and FIG. 13C are cross-sectional views along an optical axis showing an optical arrangement at the time of infinite object point focusing of a zoom lens according to a seventh embodiment of the present invention, where.
Figure 13B:
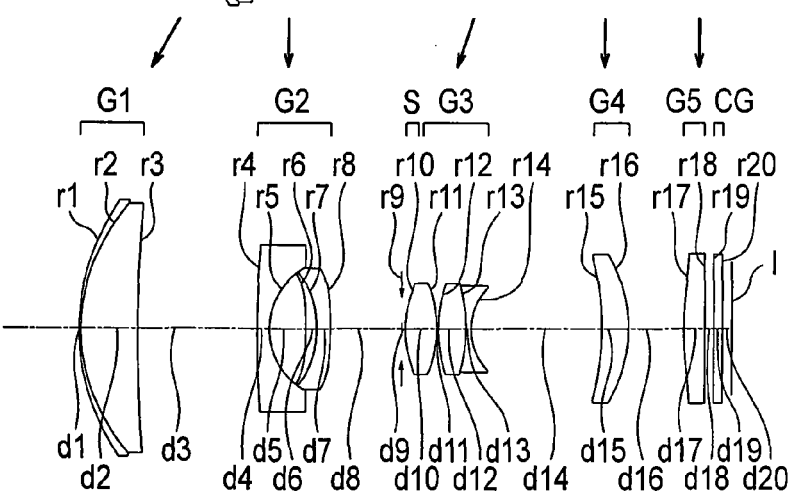
Figure 13C:
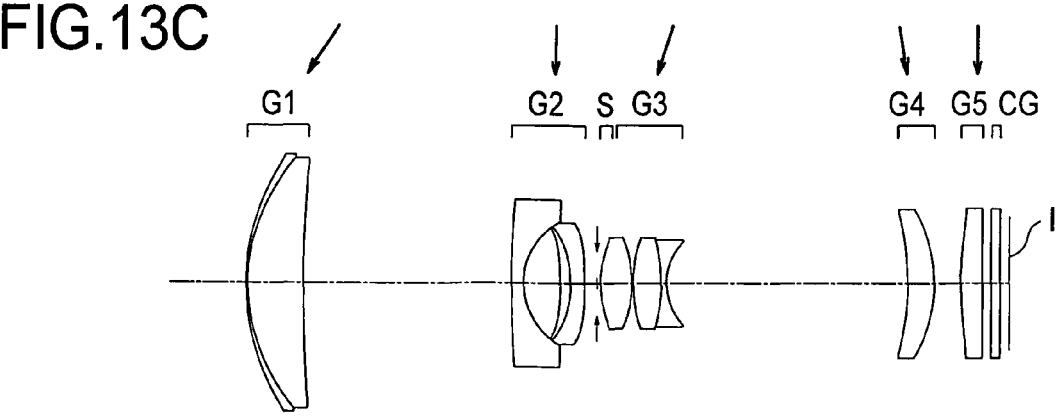

Next, a zoom lens according to the seventh embodiment of the present invention will be described below. FIG. 13A, FIG. 13B, and FIG. 13C are cross-sectional views along an optical axis showing an optical arrangement at the time of infinite object point focusing of the zoom lens according to the seventh embodiment of the present invention, where, FIG. 13A shows a state at a wide angle end, FIG. 13B shows an intermediate focal length state, and FIG. 13C shows a state at a telephoto end.

Figure 14A:
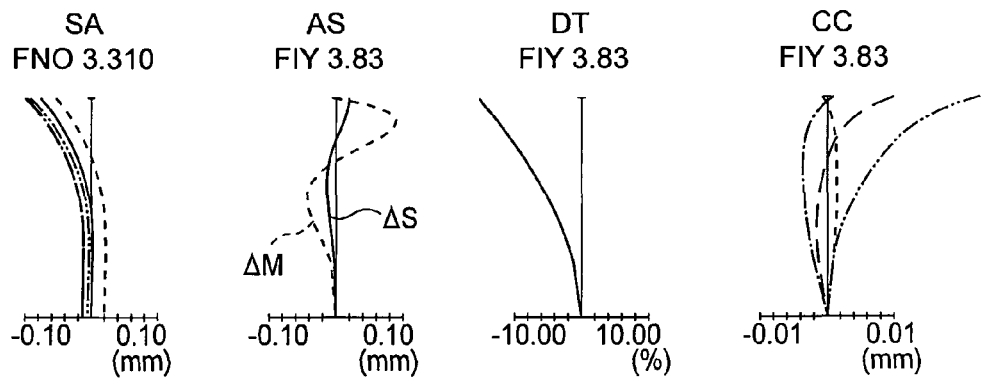
FIG. 14A, FIG. 14B, and FIG. 14C are diagrams showing a spherical aberration, an astigmatism, a distortion, and a chromatic aberration of magnification at the time of infinite object point focusing of the zoom lens according to the seventh embodiment, where.
Figure 14B:
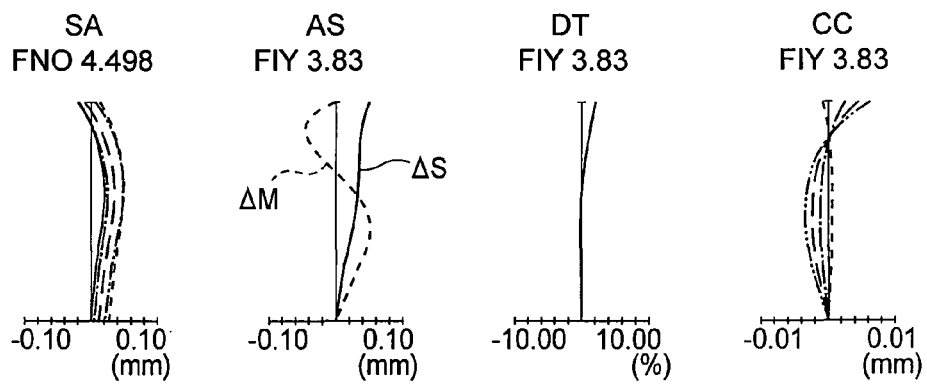
Figure 14C:
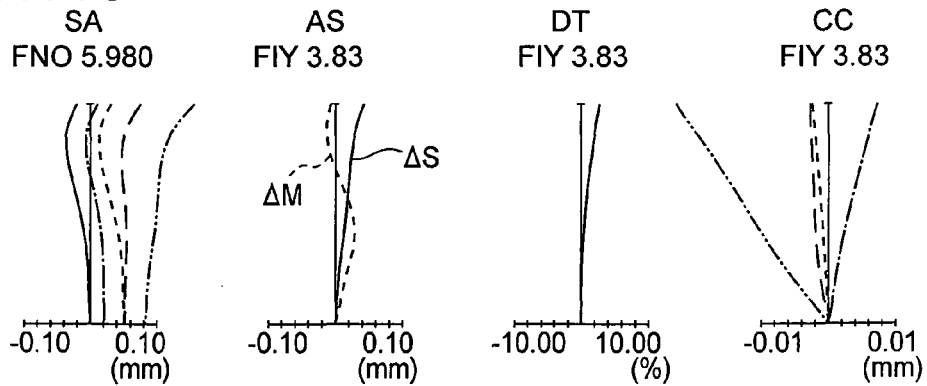

FIG. 14A, FIG. 14B, and FIG. 14C are diagrams showing a spherical aberration (SA), an astigmatism (AS), a distortion (DT), and a chromatic aberration of magnification (CC) at the time of infinite object point focusing of the zoom lens according to the seventh embodiment, where, FIG. 14A shows a state at the wide angle end, FIG. 14B shows an intermediate focal length state, and FIG. 14C shows a state at the telephoto end.

The zoom lens according to the seventh embodiment, as shown in FIG. 13A, FIG. 13B, and FIG. 13C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes a cemented lens of a negative meniscus lens L1 having a convex surface directed toward the object side and a positive meniscus lens L2 having a convex surface directed toward the object side, in order from the object side, and has a positive refractive power as a whole.

The meniscus lens L1 corresponds to the lens LC according to the present invention, and a meniscus lens L2 corresponds to the lens LD according to the present invention.

The second lens group G2 includes in order from the object side, a negative meniscus lens L3 having a convex surface directed toward the object side, and a cemented lens of the positive meniscus lens L4 having a convex surface directed toward an image side and a negative meniscus lens L5 having a convex surface directed toward the image side, and has a negative refractive power as a whole.

The meniscus lens L4 corresponds to the lens LA according to the present invention, and the meniscus lens L5 corresponds to the lens LB according to the present invention.

The third lens group G3 includes a biconvex positive lens L6, and a cemented lens of a biconvex positive lens L7 and a biconcave negative lens L8, and has a positive refractive power as a whole.

The fourth lens group G4 includes a positive meniscus lens L9 having a convex surface directed toward the image side, and has a positive refractive power as a whole.

The fifth lens group G5 includes a planoconvex positive lens L10 having a convex surface directed toward the object side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the image side. The fifth lens group G5 is substantially fixed with respect to an image position.

An aspheric surface is provided to nine surfaces namely, both surfaces of the negative meniscus lens L1 and a surface on the image side of the positive meniscus lens L2 in the first lens group G1, both surfaces of the positive meniscus lens L4 and a surface on the image side of the negative meniscus lens L5 in the second lens group G2, both surfaces of the biconvex positive lens L6 in the third lens group G3, and a surface on the object side of the planoconvex positive lens L10 in the fifth lens group G5.

Figure 15A:
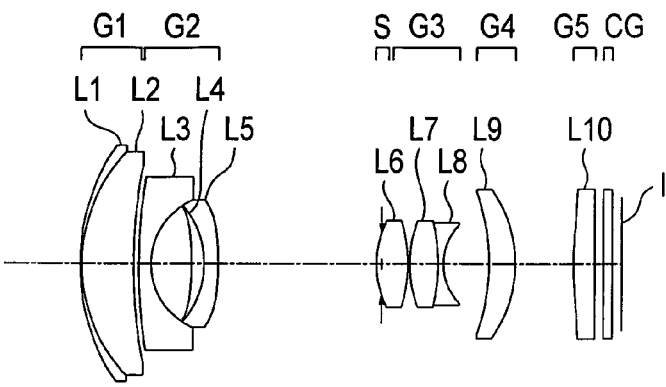
FIG. 15A, FIG. 15B, and FIG. 15C are cross-sectional views along an optical axis showing an optical arrangement at the time of infinite object point focusing of a zoom lens according to an eighth embodiment of the present invention, where.
Figure 15B:
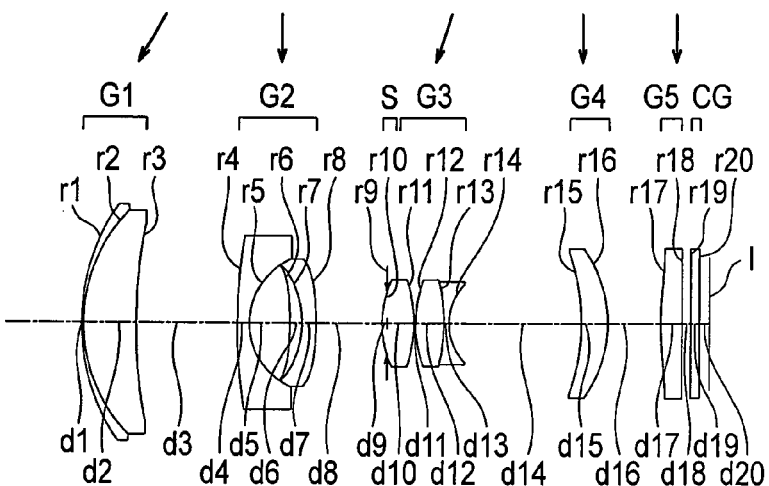
Figure 15C:
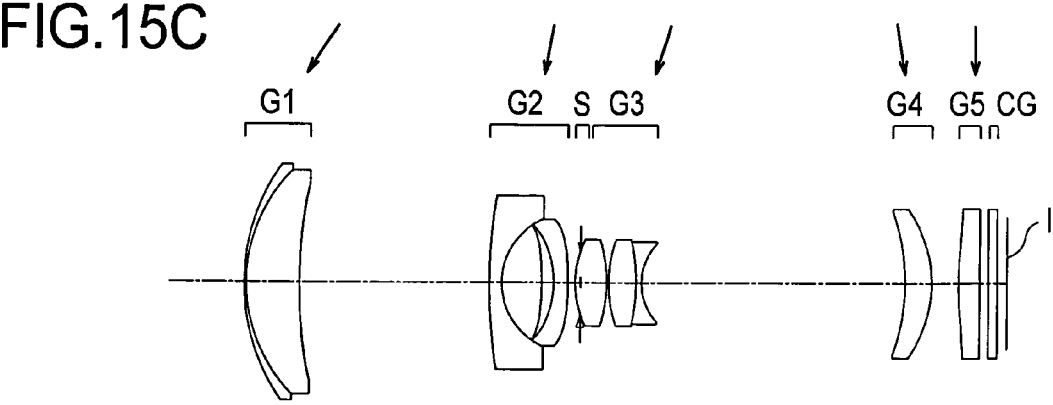

Next, a zoom lens according to the eighth embodiment of the present invention will be described below. FIG. 15A, FIG. 15B, and FIG. 15C are cross-sectional views along an optical axis showing an optical arrangement at the time of infinite object point focusing of a zoom lens according to the eighth embodiment of the present invention, where, FIG. 15A shows a state at a wide angle end, FIG. 15B shows an intermediate focal length state, and FIG. 15C shows a state at a telephoto end.

Figure 16A:
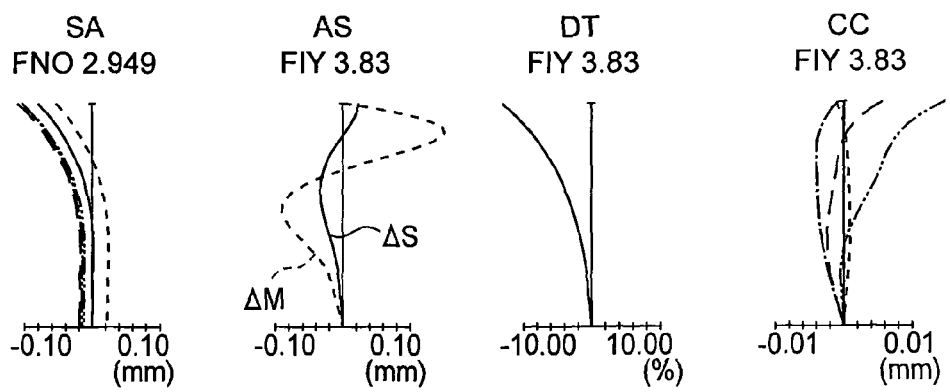
FIG. 16A, FIG. 16B, and FIG. 16C are diagrams showing a spherical aberration, an astigmatism, a distortion, and a chromatic aberration of magnification at the time of infinite object point focusing of the zoom lens according to the eighth embodiment, where.
Figure 16B:
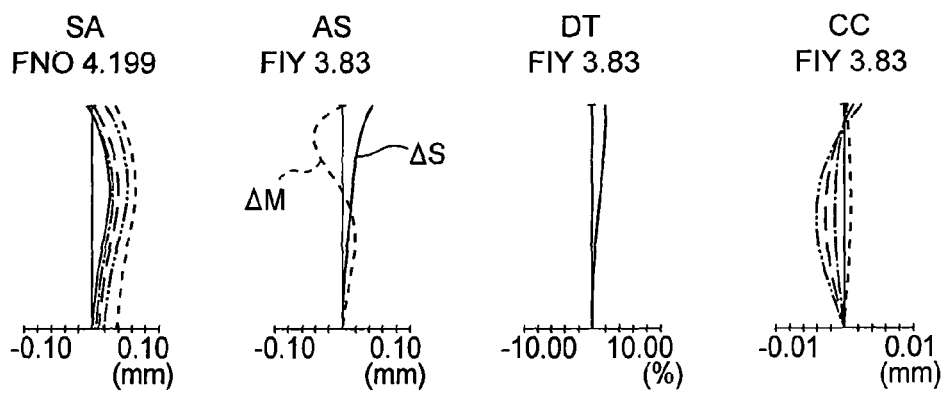
Figure 16C:
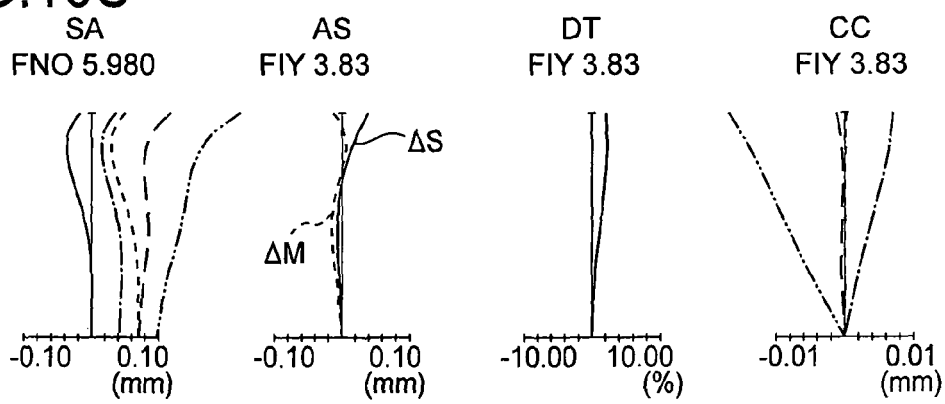

FIG. 16A, FIG. 16B, and FIG. 16C are diagrams showing a spherical aberration (SA), an astigmatism (AS), a distortion (DT), and a chromatic aberration of magnification (CC) at the time of infinite object point focusing of the zoom lens according to the eighth embodiment, where, FIG. 16A shows a state at the wide angle end, FIG. 16B shows an intermediate focal length state, and FIG. 16C shows a state at the telephoto end.

The zoom lens according to the eighth embodiment, as shown in FIG. 15A, FIG. 15B, and FIG. 15C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

The first lens group G1 includes a cemented lens of a negative meniscus lens L1 having a convex surface directed toward the object side and a positive meniscus lens L2 having a convex surface directed toward the object side, in order from the object side, and has a positive refractive power as a whole.

The meniscus lens L1 corresponds to the lens LC according to the present invention, and the meniscus lens L2 corresponds to the lens LD according to the present invention.

The second lens group G2 includes in order from the object side, a negative meniscus lens L3 having a convex surface directed toward the object side, and a cemented lens of a positive meniscus lens L4 having a convex surface directed toward an image side and a negative meniscus lens L5 having a convex surface directed toward the image side, and has a negative refractive power as a whole.

The meniscus lens L4 corresponds to the lens LA according to the present invention, and the meniscus lens L5 corresponds to the lens LB according to the present invention.

The third lens group G3 includes a biconvex positive lens L6, and a cemented lens of a biconvex positive lens L7 and a biconcave negative lens L8, and has a positive refractive power as a whole.

The fourth lens group G4 includes a positive meniscus lens L9 having a convex surface directed toward the image side, and has a positive refractive power as a whole.

The fifth lens group G5 includes a planoconvex positive lens L10 having a convex surface directed toward the object side, and has a positive refractive power as a whole.

At the time of zooming from the wide angle end to the telephoto end, the first lens group G1 moves toward the object side. The second lens group G2 moves toward the object side. The third lens group G3 moves toward the object side. The fourth lens group G4 moves toward the image side. The fifth lens group G5 is substantially fixed with respect to an image position.

An aspheric surface is provided to nine surfaces namely, both surfaces of the negative meniscus lens L1 and a surface on the image side of the positive meniscus lens L2 in the first lens group G1, both surfaces of the positive meniscus lens L4 and a surface on the image side of the negative meniscus lens L5 in the second lens group G2, both surfaces of the biconvex positive lens L6 in the third lens group G3, and a surface on the object side of the planoconvex positive lens L10 in the fifth lens group G5.

Numerical data of each embodiment described above is shown below. Each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. $F_{NO}$ denotes an F number, f denotes a focal length of the entire zoom lens system, Further, * denotes an aspheric data, S denotes a stop.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

EXAMPLE 1

| | | Unit mm | | | |
|---|---|---|---|---|---|
| | | Surface data | | | |
| Surface no. | r | d | nd | vd | effective radius |
| Object plane | ∞ | ∞ | | | |
| 1* | 18.5174 | 0.1000 | 1.63387 | 23.38 | 6.049 |
| 2* | 11.6731 | 2.8000 | 1.53071 | 55.69 | 5.681 |
| 3* | −59.7630 | Variable | | | 5.500 |
| 4 | −53.5764 | 0.7000 | 1.88300 | 40.76 | 4.025 |
| 5 | 5.2689 | 1.5000 | | | 3.129 |
| 6* | −28.7623 | 1.0000 | 1.63387 | 23.38 | 3.089 |
| 7* | −4.9078 | 0.8000 | 1.53071 | 55.69 | 3.077 |
| 8* | −489.0342 | Variable | | | 2.900 |
| 9(stop) | ∞ | −0.3000 | | | 1.892 |
| 10* | 3.9451 | 1.8000 | 1.58313 | 59.38 | 1.909 |
| 11* | −9.2478 | 0.1000 | | | 1.830 |
| 12 | 4.4930 | 1.0000 | 1.69680 | 55.53 | 1.740 |
| 13 | 6.5183 | 0.3000 | 1.80810 | 22.76 | 1.529 |
| 14 | 2.5334 | Variable | | | 1.400 |
| 15 | −135.7808 | 1.5000 | 1.53071 | 55.69 | 2.098 |
| 16* | −11.5417 | Variable | | | 2.431 |
| 17 | ∞ | 0.3000 | 1.51633 | 64.14 | 3.369 |
| 18 | ∞ | 0.5000 | | | 3.426 |
| 19 | ∞ | 0.5000 | 1.51633 | 64.14 | 3.576 |
| 20 | ∞ | 0.5524 | | | 3.673 |
| Image plane(Light receiving surface) ∞ | | | | | |
| Aspherical surface data | | | | | |

1st surface

K = 0.
A2 = 0.0000E+00, A4 = 5.6858E−05, A6 = −1.2805E−06, A8 = 1.1979E−08,
A10 = 0.0000E+00

-continued

| Unit mm |
|---|

2nd surface

K = 0.
A2 = 0.0000E+00, A4 = 1.3749E−06, A6 = 3.2489E−06, A8 = −7.1847E−08,
A10 = 0.0000E+00

3rd surface

K = 0.
A2 = 0.0000E+00, A4 = 7.4235E−05, A6 = −2.1677E−06, A8 = 3.4050E−08,
A10 = 0.0000E+00

6th surface

K = 38.5355
A2 = 0.0000E+00, A4 = −1.8042E−03, A6 = −1.9061E−05, A8 = 8.6783E−06,
A10 = −3.1590E−07

7th surface

K = 0.
A2 = 0.0000E+00, A4 = −1.9444E−04, A6 = 1.1750E−04, A8 = −9.3665E−06,
A10 = 0.0000E+00

8th surface

K = 0.
A2 = 0.0000E+00, A4 = −2.5790E−03, A6 = 2.1105E−06, A8 = 1.1436E−05,
A10 = −4.3871E−07

10th surface

K = −0.1243
A2 = 0.0000E+00, A4 = −2.4649E−03, A6 = −3.4466E−05, A8 = −8.8522E−06,
A10 = −1.2402E−06

11th surface

K = −6.1126
A2 = 0.0000E+00, A4 = 5.4821E−06, A6 = −4.5069E−05, A8 = −1.2007E−05,
A10 = 0.0000E+00

16th surface

K = 0.
A2 = 0.0000E+00, A4 = 1.1529E−03, A6 = −8.4167E−05, A8 = 1.5496E−06,
A10 = 0.0000E+00

| Various data | | | |
|---|---|---|---|
| | Wide angle | Intermediate | Telephoto |
| FL | 4.79720 | 10.62065 | 23.96029 |
| Fno. | 2.8406 | 4.0036 | 5.9893 |
| ω | 42.4° | 18.9° | 8.8° |
| Image height | 3.83 | 3.83 | 3.83 |
| Lens total length | 25.4361 | 30.5556 | 37.8419 |
| d3 | 0.40000 | 5.23243 | 8.73914 |
| d8 | 6.76865 | 3.42643 | 0.70000 |
| d14 | 2.21851 | 7.56410 | 13.77992 |
| d16 | 2.89658 | 1.19735 | 1.48626 |

| Group | Initial surface | Focal length |
|---|---|---|
| 1 | 1 | 29.53243 |
| 2 | 4 | −5.49397 |
| 3 | 9 | 6.37236 |
| 4 | 15 | 23.66882 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L2, L5, L9 | 1.530710 | 1.527870 | 1.537400 | 1.542740 | 1.547272 |
| L1, L4 | 1.633870 | 1.626381 | 1.653490 | 1.671610 | 1.688826 |
| L6 | 1.583126 | 1.580139 | 1.589960 | 1.595296 | 1.599721 |
| L10, L11 | 1.516330 | 1.513855 | 1.521905 | 1.526213 | 1.529768 |
| L3 | 1.882997 | 1.876560 | 1.898221 | 1.910495 | 1.920919 |
| L7 | 1.696797 | 1.692974 | 1.705522 | 1.712339 | 1.718005 |
| L8 | 1.808095 | 1.798009 | 1.833513 | 1.855902 | 1.876580 |

EXAMPLE 2

| | | Unit mm | | | |
|---|---|---|---|---|---|
| | | Surface data | | | |
| Surface no. | r | d | nd | vd | effective radius |
| Object plane | ∞ | ∞ | | | |
| 1* | 19.3260 | 0.1000 | 1.71003 | 14.57 | 5.890 |
| 2* | 15.3389 | 2.3000 | 1.53071 | 55.69 | 5.715 |
| 3* | −77.2144 | Variable | | | 5.500 |
| 4 | −72.4395 | 0.7000 | 1.88300 | 40.76 | 4.339 |
| 5 | 5.5442 | 2.0000 | | | 3.398 |
| 6* | −25.0712 | 0.5000 | 1.71003 | 14.57 | 3.295 |
| 7* | −8.9406 | 0.8000 | 1.53071 | 55.69 | 3.294 |
| 8* | −52.2700 | Variable | | | 3.200 |
| 9(stop) | ∞ | −0.3000 | | | 2.019 |
| 10* | 3.9529 | 1.8000 | 1.58313 | 59.38 | 2.045 |
| 11* | −9.9056 | 0.1000 | | | 1.935 |
| 12 | 4.6792 | 1.0000 | 1.69680 | 55.53 | 1.770 |
| 13 | 6.9776 | 0.3000 | 1.80810 | 22.76 | 1.536 |
| 14 | 2.5747 | Variable | | | 1.400 |
| 15 | −20.6417 | 1.5000 | 1.53071 | 55.69 | 2.046 |
| 16* | −8.0690 | Variable | | | 2.400 |
| 17 | ∞ | 0.3000 | 1.51633 | 64.14 | 3.394 |
| 18 | ∞ | 0.5000 | | | 3.449 |
| 19 | ∞ | 0.5000 | 1.51633 | 64.14 | 3.591 |
| 20 | ∞ | 0.5494 | | | 3.683 |
| Image plane(Light receiving surface) ∞ | | | | | |

| Aspherical surface data |
|---|

1st surface

K = 0.
A2 = 0.0000E+00, A4 = 1.3579E−04, A6 = −3.3957E−06, A8 = 4.7189E−08,
A10 = 0.0000E+00

2nd surface

K = 0.
A2 = 0.0000E+00, A4 = 1.2704E−04, A6 = −1.7806E−06, A8 = −4.5828E−10,
A10 = 0.0000E+00

3rd surface

K = 0.
A2 = 0.0000E+00, A4 = 1.7059E−04, A6 = −5.5615E−06, A8 = 1.0432E−07,
A10 = 0.0000E+00

6th surface

K = 38.4082
A2 = 0.0000E+00, A4 = −1.5821E−03, A6 = −4.9587E−05, A8 = 8.2596E−06,
A10 = −1.9467E−08

7th surface

K = 0.
A2 = 0.0000E+00, A4 = −1.2464E−03, A6 = −3.9906E−05, A8 = 3.4685E−06,
A10 = 0.0000E+00

8th surface

K = 0.
A2 = 0.0000E+00, A4 = −2.3783E−03, A6 = −4.5751E−05, A8 = 1.2255E−05,
A10 = −3.3359E−07

10th surface

K = −0.1223
A2 = 0.0000E+00, A4 = −2.2778E−03, A6 = −6.4175E−05, A8 = 3.0664E−06,
A10 = −2.2602E−06

11th surface

K = −6.0660
A2 = 0.0000E+00, A4 = 6.6462E−06, A6 = 1.9775E−05, A8 = −1.8356E−05,
A10 = 0.0000E+00

-continued

Unit mm

16th surface

K = 0.
A2 = 0.0000E+00, A4 = 1.3590E−03, A6 = −8.5617E−05, A8 = 1.8495E−06,
A10 = 0.0000E+00

Various data

|  | Wide angle | Intermediate | Telephoto |
|---|---|---|---|
| FL | 4.79880 | 11.53189 | 23.98403 |
| Fno. | 2.7257 | 4.1237 | 5.9893 |
| ω | 42.3° | 17.7° | 8.8° |
| Image height | 3.83 | 3.83 | 3.83 |
| Lens total length | 26.1394 | 30.7582 | 37.7375 |
| d3 | 0.40000 | 5.03451 | 8.33503 |
| d8 | 7.72257 | 3.34284 | 0.70000 |
| d14 | 2.19978 | 8.52062 | 14.57717 |
| d16 | 3.16762 | 1.20283 | 1.48460 |

| Group | Initial surface | Focal length |
|---|---|---|
| 1 | 1 | 31.57200 |
| 2 | 4 | −5.99507 |
| 3 | 9 | 6.74591 |
| 4 | 15 | 23.97068 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L2, L5, L9 | 1.530710 | 1.527870 | 1.537400 | 1.542740 | 1.547272 |
| L1, L4 | 1.710030 | 1.696030 | 1.744770 | 1.779970 | 1.816000 |
| L6 | 1.583126 | 1.580139 | 1.589960 | 1.595296 | 1.599721 |
| L10, L11 | 1.516330 | 1.513855 | 1.521905 | 1.526213 | 1.529768 |
| L3 | 1.882997 | 1.876560 | 1.898221 | 1.910495 | 1.920919 |
| L7 | 1.696797 | 1.692974 | 1.705522 | 1.712339 | 1.718005 |
| L8 | 1.808095 | 1.798009 | 1.833513 | 1.855902 | 1.876580 |

EXAMPLE 3

Unit mm

Surface data

| Surface no. | r | d | nd | νd | effective radius |
|---|---|---|---|---|---|
| Object plane | ∞ | ∞ | | | |
| 1* | 11.6138 | 0.1000 | 1.63387 | 23.38 | 6.261 |
| 2* | 8.3766 | 3.2865 | 1.53071 | 55.69 | 5.824 |
| 3* | 84.2186 | Variable | | | 5.200 |
| 4 | 84.1740 | 0.7000 | 1.88300 | 40.76 | 4.123 |
| 5 | 4.1516 | 1.9000 | | | 3.003 |
| 6* | −38.7681 | 1.0000 | 1.63387 | 23.38 | 2.897 |
| 7* | −4.9893 | 0.8000 | 1.53071 | 55.69 | 2.884 |
| 8* | 221.7501 | Variable | | | 2.700 |
| 9 (stop) | ∞ | −0.3000 | | | 1.848 |
| 10* | 5.6005 | 1.8029 | 1.58313 | 59.38 | 1.848 |
| 11* | −6.6846 | 0.1000 | | | 2.015 |
| 12 | 7.5088 | 1.5987 | 1.69680 | 55.53 | 2.025 |
| 13 | −10.4416 | 0.3000 | 1.69895 | 30.13 | 1.905 |
| 14 | 3.3324 | Variable | | | 1.799 |
| 15 | −13.4131 | 1.5000 | 1.53071 | 55.69 | 2.371 |
| 16 | −7.8791 | Variable | | | 2.695 |
| 17* | 17.8930 | 1.2000 | 1.53071 | 55.69 | 3.523 |
| 18 | ∞ | 0.5000 | | | 3.631 |

-continued

| | | | | | |
|---|---|---|---|---|---|
| 19 | ∞ | 0.5000 | 1.51633 | 64.14 | 3.714 |
| 20 | ∞ | 0.5524 | | | 3.768 |
| Image plane (Light receiving surface) | ∞ | | | | |

Aspherical surface data

1st surface

K = 0.
A2 = 0.0000E+00, A4 = −5.2038E−05, A6 = 9.2429E−07, A8 = −6.6982E−10, A10 = 0.0000E+00

2nd surface

K = 0.
A2 = 0.0000E+00, A4 = −1.4453E−04, A6 = 3.0174E−06, A8 = −4.5448E−08, A10 = 0.0000E+00

3rd surface

K = 0.
A2 = 0.0000E+00, A4 = −4.0937E−05, A6 = 2.1932E−06, A8 = −1.4276E−08, A10 = 8.5105E−12

6th surface

K = 33.6212
A2 = 0.0000E+00, A4 = −1.4314E−03, A6 = −2.2132E−06, A8 = −9.1737E−06, A10 = 3.8832E−07

7th surface

K = 0.
A2 = 0.0000E+00, A4 = 3.6629E−04, A6 = −1.3701E−04, A8 = 0.0000E+00, A10 = 0.0000E+00

8th surface

K = 0.
A2 = 0.0000E+00, A4 = −2.4362E−03, A6 = 1.4641E−05, A8 = −2.5838E−06, A10 = 0.0000E+00

10th surface

K = 0.0262
A2 = 0.0000E+00, A4 = −3.1344E−03, A6 = −4.2912E−05, A8 = −3.7353E−05, A10 = −3.0172E−06

11th surface

K = −6.1008
A2 = 0.0000E+00, A4 = −3.1838E−03, A6 = 7.6146E−05, A8 = −5.0105E−05, A10 = 0.0000E+00

17th surface

K = 0.
A2 = 0.0000E+00, A4 = −1.3350E−03, A6 = 3.3013E−05, A8 = 0.0000E+00, A10 = 0.0000E+00

| Various data | Wide angle | Intermediate | Telephoto |
|---|---|---|---|
| FL | 4.79957 | 12.56021 | 33.59253 |
| Fno. | 3.1675 | 4.5878 | 5.9800 |
| ω | 42.8° | 16.5° | 6.4° |
| Image height | 3.83 | 3.83 | 3.83 |
| Lens total length | 30.0391 | 35.7267 | 43.3290 |
| d3 | 0.40000 | 5.75020 | 12.06710 |
| d8 | 8.22200 | 3.56049 | 0.70000 |
| d14 | 2.60114 | 7.58304 | 13.53310 |
| d16 | 3.27546 | 3.28529 | 1.49568 |
| d18 | 0.50000 | 0.50000 | 0.50000 |

| Group | Initial surface | Focal length |
|---|---|---|
| 1 | 1 | 27.32498 |
| 2 | 4 | −5.09066 |
| 3 | 9 | 7.08264 |
| 4 | 15 | 32.89250 |
| 5 | 17 | 33.71518 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L2, L5, L9, L10 | 1.530710 | 1.527870 | 1.537400 | 1.542740 | 1.547272 |
| L1, L4 | 1.633870 | 1.626381 | 1.653490 | 1.671610 | 1.688826 |
| L6 | 1.583126 | 1.580139 | 1.589960 | 1.595296 | 1.599721 |
| L11 | 1.516330 | 1.513855 | 1.521905 | 1.526213 | 1.529768 |
| L3 | 1.882997 | 1.876560 | 1.898221 | 1.910495 | 1.920919 |
| L7 | 1.696797 | 1.692974 | 1.705522 | 1.712339 | 1.718005 |
| L8 | 1.698947 | 1.692225 | 1.715424 | 1.729410 | 1.741890 |

EXAMPLE 4

| | Unit mm | | | | |
|---|---|---|---|---|---|
| | Surface data | | | | |
| Surface no. | r | d | nd | vd | effective radius |
| Object plane | ∞ | ∞ | | | |
| 1* | 11.1053 | 0.1000 | 1.71003 | 14.57 | 5.955 |
| 2* | 9.5950 | 3.0620 | 1.53071 | 55.69 | 5.744 |
| 3* | 50.9055 | Variable | | | 5.200 |
| 4 | 50.7715 | 0.7000 | 1.88300 | 40.76 | 4.128 |
| 5 | 4.1294 | 2.2000 | | | 3.009 |
| 6* | −20.2526 | 0.4000 | 1.71003 | 14.57 | 2.852 |
| 7* | −8.1442 | 0.8000 | 1.53071 | 55.69 | 2.855 |
| 8* | −40.3610 | Variable | | | 2.800 |
| 9 (stop) | 0 | −0.3000 | | | 1.997 |
| 10* | 5.1861 | 1.8096 | 1.58313 | 59.38 | 2.004 |
| 11* | −7.4953 | 0.1000 | | | 2.000 |
| 12 | 7.3819 | 1.5995 | 1.69680 | 55.53 | 2.011 |
| 13 | −9.9399 | 0.3000 | 1.69895 | 30.13 | 1.891 |
| 14 | 3.2970 | Variable | | | 1.785 |
| 15 | −11.8281 | 1.5000 | 1.53071 | 55.69 | 2.354 |
| 16 | −7.3892 | Variable | | | 2.688 |
| 17* | 17.8301 | 1.2000 | 1.53071 | 55.69 | 3.496 |
| 18 | ∞ | 0.5000 | | | 3.613 |
| 19 | ∞ | 0.5000 | 1.51633 | 64.14 | 3.703 |
| 20 | ∞ | 0.5528 | | | 3.762 |
| Image plane (Light receiving surface) | ∞ | | | | |

Aspherical surface data

1st surface $K = 0.$
$A2 = 0.0000E+00, A4 = -4.4522E-05, A6 = 7.5725E-07, A8 = 1.2195E-08, A10 = 0.0000E+00$ 2nd surface $K = 0.$
$A2 = 0.0000E+00, A4 = -6.0488E-05, A6 = 9.2905E-07, A8 = 1.0974E-08, A10 = 0.0000E+00$ 3rd surface $K = 0.$
$A2 = 0.0000E+00, A4 = -4.2531E-05, A6 = 2.9618E-06, A8 = -1.4764E-08, A10 = 5.5173E-11$ 6th surface $K = 32.8928$
$A2 = 0.0000E+00, A4 = -1.3976E-03, A6 = -1.3430E-07, A8 = -1.4428E-05, A10 = 8.4371E-07$ 7th surface $K = 0.$
$A2 = 0.0000E+00, A4 = -1.2971E-03, A6 = -1.3519E-04, A8 = 0.0000E+00, A10 = 0.0000E+00$ 8th surface $K = 0.$
$A2 = 0.0000E+00, A4 = -2.7035E-03, A6 = -2.3747E-05, A8 = -2.7067E-06, A10 = 0.0000E+00$ 10th surface $K = 0.1464$
$A2 = 0.0000E+00, A4 = -2.4544E-03, A6 = -2.0154E-05, A8 = -1.5725E-05, A10 = -1.0269E-06$ 11th surface $K = -6.0578$
$A2 = 0.0000E+00, A4 = -1.6091E-03, A6 = 5.8427E-05, A8 = -2.4861E-05, A10 = 0.0000E+00$ 17th surface $K = 0.$
$A2 = 0.0000E+00, A4 = -1.2032E-03, A6 = 1.8982E-05, A8 = 0.0000E+00, A10 = 0.0000E+00$

| Various data | Wide angle | Intermediate | Telephoto |
|---|---|---|---|
| FL | 4.79993 | 12.50011 | 33.59834 |
| Fno. | 2.9280 | 4.2575 | 5.9801 |
| ω | 42.9° | 16.6° | 6.4° |
| Image height | 3.83 | 3.83 | 3.83 |
| Lens total length | 29.5097 | 34.7973 | 43.3079 |
| d3 | 0.30000 | 5.49125 | 11.34960 |
| d8 | 8.47139 | 3.57524 | 0.70000 |

-continued

| | | | |
|---|---|---|---|
| d14 | 2.59922 | 7.26108 | 14.74118 |
| d16 | 3.11512 | 3.44027 | 1.49638 |
| d18 | 0.50000 | 0.50000 | 0.50000 |

| Group | Initial surface | Focal length |
|---|---|---|
| 1 | 1 | 27.87401 |
| 2 | 4 | −5.22393 |
| 3 | 9 | 7.06124 |
| 4 | 15 | 33.20946 |
| 5 | 17 | 33.59663 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L2, L5, L9, L10 | 1.530710 | 1.527870 | 1.537400 | 1.542740 | 1.547272 |
| L1, L4 | 1.710030 | 1.696030 | 1.744770 | 1.779970 | 1.816000 |
| L6, | 1.583126 | 1.580139 | 1.589960 | 1.595296 | 1.599721 |
| L11 | 1.516330 | 1.513855 | 1.521905 | 1.526213 | 1.529768 |
| L3 | 1.882997 | 1.876560 | 1.898221 | 1.910495 | 1.920919 |
| L7 | 1.696797 | 1.692974 | 1.705522 | 1.712339 | 1.718005 |
| L8 | 1.698947 | 1.692225 | 1.715424 | 1.729410 | 1.741890 |

EXAMPLE 5

Unit mm

Surface data

| Surface no. | r | d | nd | νd | effective radius |
|---|---|---|---|---|---|
| Object plane | ∞ | ∞ | | | |
| 1* | 11.4663 | 0.1000 | 1.67233 | 20.43 | 6.401 |
| 2* | 8.9239 | 3.2438 | 1.53071 | 55.69 | 6.038 |
| 3* | 80.2135 | Variable | | | 5.200 |
| 4 | 79.3433 | 0.7000 | 1.88300 | 40.76 | 4.340 |
| 5 | 4.1306 | 2.1000 | | | 3.127 |
| 6* | −25.9148 | 0.7000 | 1.67233 | 20.43 | 3.057 |
| 7* | −5.8875 | 0.8000 | 1.53071 | 55.69 | 3.060 |
| 8* | −126.3265 | Variable | | | 3.000 |
| 9 (stop) | ∞ | −0.3000 | | | 1.855 |
| 10* | 5.7632 | 1.8182 | 1.58313 | 59.38 | 1.859 |
| 11* | −6.6203 | 0.1000 | | | 2.026 |
| 12 | 7.6392 | 1.5965 | 1.69680 | 55.53 | 2.037 |
| 13 | −9.8103 | 0.3000 | 1.69895 | 30.13 | 1.919 |
| 14 | 3.3939 | Variable | | | 1.815 |
| 15 | −13.6893 | 1.5000 | 1.53071 | 55.69 | 2.378 |
| 16 | −7.9621 | Variable | | | 2.696 |
| 17* | 17.7880 | 1.2000 | 1.53071 | 55.69 | 3.535 |
| 18 | ∞ | 0.5000 | | | 3.640 |
| 19 | ∞ | 0.5000 | 1.51633 | 64.14 | 3.721 |
| 20 | ∞ | 0.5518 | | | 3.775 |

Image plane (Light receiving surface) ∞

Aspherical surface data

1st surface

K = 0.
A2 = 0.0000E+00, A4 = −5.1391E−05, A6 = 5.1473E−07, A8 = 4.0920E−09, A10 = 0.0000E+00
2nd surface K = 0.
A2 = 0.0000E+00, A4 = −9.2193E−05, A6 = 9.4839E−07, A8 = −9.0600E−09, A10 = 0.0000E+00
3rd surface K = 0.
A2 = 0.0000E+00, A4 = −4.6044E−05, A6 = 1.9550E−06, A8 = −1.0651E−08, A10 = 2.1481E−11
6th surface K = 33.6337
A2 = 0.0000E+00, A4 = −1.3121E−03, A6 = −8.3098E−06, A8 = −9.1876E−06, A10 = 3.5975E−07

-continued

7th surface

K = 0.
A2 = 0.0000E+00, A4 = −4.0609E−04, A6 = −1.4180E−04, A8 = 0.0000E+00, A10 = 0.0000E+00

8th surface

K = 0.
A2 = 0.0000E+00, A4 = −2.4719E−03, A6 = 6.6484E−06, A8 = −3.3473E−06, A10 = 0.0000E+00

10th surface

K = 0.0506
A2 = 0.0000E+00, A4 = −3.1629E−03, A6 = −6.9010E−05, A8 = −3.1667E−05, A10 = −3.8409E−06

11th surface

K = −6.1104
A2 = 0.0000E+00, A4 = −3.3678E−03, A6 = 7.4962E−05, A8 = −5.0123E−05, A10 = 0.0000E+00

17th surface

K = 0.
A2 = 0.0000E+00, A4 = −1.2383E−03, A6 = 2.6812E−05, A8 = 0.0000E+00, A10 = 0.0000E+00

| Various data | Wide angle | Intermediate | Telephoto |
|---|---|---|---|
| FL | 4.79983 | 12.58300 | 33.59595 |
| Fno. | 3.1740 | 4.5381 | 5.9800 |
| ω | 42.8° | 16.5° | 6.4° |
| Image height | 3.83 | 3.83 | 3.83 |
| Lens total length | 30.1739 | 35.9285 | 43.3184 |
| d3 | 0.40000 | 5.98091 | 11.98433 |
| d8 | 8.35272 | 3.66384 | 0.70000 |
| d14 | 2.59985 | 7.50935 | 13.73158 |
| d16 | 3.41096 | 3.35519 | 1.49630 |
| d18 | 0.50000 | 0.50000 | 0.50000 |

| Group | Initial surface | Focal length |
|---|---|---|
| 1 | 1 | 27.15271 |
| 2 | 4 | −5.12268 |
| 3 | 9 | 7.19839 |
| 4 | 15 | 32.87452 |
| 5 | 17 | 33.51742 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L2, L5, L9, L10 | 1.530710 | 1.527870 | 1.537400 | 1.542740 | 1.547272 |
| L1, L4 | 1.672330 | 1.661700 | 1.694610 | 1.716930 | 1.738810 |
| L6 | 1.583126 | 1.580139 | 1.589960 | 1.595296 | 1.599721 |
| L11 | 1.516330 | 1.513855 | 1.521905 | 1.526213 | 1.529768 |
| L3 | 1.882997 | 1.876560 | 1.898221 | 1.910495 | 1.920919 |
| L7 | 1.696797 | 1.692974 | 1.705522 | 1.712339 | 1.718005 |
| L8 | 1.698947 | 1.692225 | 1.715424 | 1.729410 | 1.741890 |

EXAMPLE 6

| Unit mm | | | | | |
|---|---|---|---|---|---|
| Surface data | | | | | |
| Surface no. | r | d | nd | vd | effective radius |
| Object plane | ∞ | ∞ | | | |
| 1* | 12.7761 | 0.1000 | 1.63387 | 23.38 | 6.345 |
| 2* | 9.2401 | 3.3169 | 1.62263 | 58.16 | 5.945 |
| 3* | 49.7298 | Variable | | | 5.600 |
| 4 | 49.4281 | 0.7000 | 1.88300 | 40.76 | 4.063 |
| 5 | 3.9335 | 1.9000 | | | 2.916 |
| 6* | −25.4911 | 1.0000 | 1.63387 | 23.38 | 2.809 |
| 7* | −4.7845 | 0.8000 | 1.62263 | 58.16 | 2.791 |
| 8* | −26.5242 | Variable | | | 2.700 |
| 9 (stop) | ∞ | −0.3000 | | | 1.838 |
| 10* | 5.7804 | 1.8206 | 1.58313 | 59.38 | 1.839 |
| 11* | −6.4315 | 0.1000 | | | 2.010 |
| 12 | 8.0856 | 1.5967 | 1.69680 | 55.53 | 2.020 |
| 13 | −9.5283 | 0.3000 | 1.69895 | 30.13 | 1.909 |

-continued

| | | | | | |
|---|---|---|---|---|---|
| 14 | 3.4589 | Variable | | | 1.812 |
| 15 | −15.2732 | 1.5000 | 1.53071 | 55.69 | 2.385 |
| 16 | −8.4318 | Variable | | | 2.696 |
| 17* | 17.7722 | 1.2000 | 1.53071 | 55.69 | 3.545 |
| 18 | ∞ | 0.5000 | | | 3.644 |
| 19 | ∞ | 0.5000 | 1.51633 | 64.14 | 3.723 |
| 20 | ∞ | 0.5515 | | | 3.775 |

| | |
|---|---|
| Image plane (Light receiving surface) | ∞ |

Aspherical surface data

1st surface

K = 0.
A2 = 0.0000E+00, A4 = −7.0207E−05, A6 = 7.8263E−07, A8 = −1.5101E−09, A10 = 0.0000E+00

2nd surface

K = 0.
A2 = 0.0000E+00, A4 = −1.2751E−04, A6 = 1.8248E−06, A8 = −2.4700E−08, A10 = 0.0000E+00

3rd surface

K = 0.
A2 = 0.0000E+00, A4 = −9.5712E−05, A6 = 2.7897E−06, A8 = −2.933E−08, A10 = 1.4761E−10

6th surface

K = 33.6183
A2 = 0.0000E+00, A4 = −8.8519E−04, A6 = −1.5697E−05, A8 = −7.0488E−06, A10 = 1.0529E−07

7th surface

K = 0.
A2 = 0.0000E+00, A4 = 6.1028E−04, A6 = −1.4572E−04, A8 = 0.0000E+00, A10 = 0.0000E+00

8th surface

K = 0.
A2 = 0.0000E+00, A4 = −1.8064E−03, A6 = −1.7011E−05, A8 = −2.3073E−06, A10 = 0.0000E+00

10th surface

K = 0.0245
A2 = 0.0000E+00, A4 = −3.3011E−03, A6 = −6.8213E−05, A8 = −3.7016E−05, A10 = −4.0001E−06

11th surface

K = −6.1187
A2 = 0.0000E+00, A4 = −3.6262E−03, A6 = 8.0005E−05, A8 = −5.3596E−05, A10 = 0.0000E+00

17th surface

K = 0.
A2 = 0.0000E+00, A4 = −9.2442E−04, A6 = 1.2952E−05, A8 = 0.0000E+00, A10 = 0.0000E+00

| Various data | Wide angle | Intermediate | Telephoto |
|---|---|---|---|
| FL | 4.79972 | 12.59816 | 33.59557 |
| Fno. | 3.2067 | 4.5219 | 5.9800 |
| ω | 42.7° | 16.6° | 6.4° |
| Image height | 3.83 | 3.83 | 3.83 |
| Lens total length | 30.3647 | 36.2410 | 43.3151 |
| d3 | 0.40000 | 6.20872 | 11.90320 |
| d8 | 8.32803 | 3.73374 | 0.70000 |
| d14 | 2.60046 | 7.38990 | 13.63330 |
| d16 | 3.45059 | 3.31498 | 1.49666 |
| d18 | 0.50000 | 0.50000 | 0.50000 |

| Group | Initial surface | Focal length |
|---|---|---|
| 1 | 1 | 26.91257 |
| 2 | 4 | −5.06880 |
| 3 | 9 | 7.23253 |
| 4 | 15 | 32.96273 |
| 5 | 17 | 33.48752 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L9, L10 | 1.530710 | 1.527870 | 1.537400 | 1.542740 | 1.547272 |
| L2, L5 | 1.622630 | 1.619350 | 1.630050 | 1.635825 | 1.640604 |
| L1, L4 | 1.633870 | 1.626381 | 1.653490 | 1.671610 | 1.688826 |
| L6 | 1.583126 | 1.580139 | 1.589960 | 1.595296 | 1.599721 |
| L11 | 1.516330 | 1.513855 | 1.521905 | 1.526213 | 1.529768 |
| L3 | 1.882997 | 1.876560 | 1.898221 | 1.910495 | 1.920919 |

| | | | | | |
|---|---|---|---|---|---|
| L7 | 1.696797 | 1.692974 | 1.705522 | 1.712339 | 1.718005 |
| L8 | 1.698947 | 1.692225 | 1.715424 | 1.729410 | 1.741890 |

EXAMPLE 7

Unit mm

Surface data

| Surface no. | r | d | nd | vd | effective radius |
|---|---|---|---|---|---|
| Object plane | ∞ | ∞ | | | |
| 1* | 12.4684 | 0.1000 | 1.77260 | 17.75 | 6.557 |
| 2* | 10.3266 | 3.1740 | 1.62263 | 58.16 | 6.290 |
| 3* | 60.3108 | Variable | | | 6.300 |
| 4 | 58.2998 | 0.7000 | 1.88300 | 40.76 | 4.326 |
| 5 | 4.1012 | 2.1000 | | | 3.085 |
| 6* | −21.0015 | 0.6000 | 1.77260 | 17.75 | 2.998 |
| 7* | −7.1601 | 0.8000 | 1.62263 | 58.16 | 3.009 |
| 8* | −42.2742 | Variable | | | 3.000 |
| 9(stop) | ∞ | 0.2000 | | | 1.773 |
| 10* | 5.3426 | 1.8034 | 1.58313 | 59.38 | 2.002 |
| 11* | −7.5418 | 0.1000 | | | 2.135 |
| 12 | 8.4429 | 1.5892 | 1.69680 | 55.53 | 2.133 |
| 13 | −9.8411 | 0.3000 | 1.69895 | 30.13 | 2.013 |
| 14 | 3.5736 | Variable | | | 1.900 |
| 15 | −16.9519 | 1.5000 | 1.53071 | 55.69 | 2.436 |
| 16 | −8.8237 | Variable | | | 2.730 |
| 17* | 17.5619 | 1.2000 | 1.53071 | 55.69 | 3.558 |
| 18 | ∞ | 0.5000 | | | 3.647 |
| 19 | ∞ | 0.5000 | 1.51633 | 64.14 | 3.719 |
| 20 | ∞ | 0.5535 | | | 3.766 |
| Image plane (Light receiving surface) ∞ | | | | | |

Aspherical surface data

1st surface $K = 0.$
$A2 = 0.0000E+00,\quad A4 = -8.8364E-05,\quad A6 = 6.0180E-07,\quad A8 = -3.3057E-09,$
$A10 = 0.0000E+00$ 2nd surface $K = 0.$
$A2 = 0.0000E+00,\quad A4 = -1.0774E-04,\quad A6 = 7.8472E-07,\quad A8 = -1.0571E-08,$
$A10 = 0.0000E+00$ 3rd surface $K = 0.$
$A2 = 0.0000E+00,\quad A4 = -1.1510E-04,\quad A6 = 2.2999E-06,\quad A8 = -2.2602E-08,$
$A10 = 1.0128E-10$ 6th surface $K = 33.6130$
$A2 = 0.0000E+00,\quad A4 = -1.4823E-03,\quad A6 = 1.9472E-05,\quad A8 = -7.4430E-06,$
$A10 = 2.0353E-07$ 7th surface $K = 0.$
$A2 = 0.0000E+00,\quad A4 = -1.1520E-03,\quad A6 = -1.0610E-04,\quad A8 = 0.0000E+00,$
$A10 = 0.0000E+00$ 8th surface $K = 0.$
$A2 = 0.0000E+00,\quad A4 = -2.5478E-03,\quad A6 = 3.6223E-05,\quad A8 = -5.2638E-06,$
$A10 = 0.0000E+00$ 10h surface $K = 0.0820$
$A2 = 0.0000E+00,\quad A4 = -2.2997E-03,\quad A6 = -1.2637E-07,\quad A8 = -1.8860E-05,$
$A10 = -8.4108E-07$ -continued 11th surface K = −6.1332
A2 = 0.0000E+00, A4 = −1.6051E−03, A6 = 4.8239E−05, A8 = −2.3815E−05,
A10 = 0.0000E+00

17th surface

K = 0.
A2 = 0.0000E+00, A4 = −6.4719E−04, A6 = −2.8991E−06, A8 = 0.0000E+00,
A10 = 0.0000E+00

| Various data | Wide angle | Intermediate | Telephoto |
|---|---|---|---|
| FL | 4.79980 | 12.71668 | 33.59397 |
| Fno. | 3.3098 | 4.4981 | 5.9800 |
| ω | 43.2° | 16.4° | 6.3° |
| Image height | 3.83 | 3.83 | 3.83 |
| Lens total length | 30.9681 | 37.1093 | 43.3238 |
| d3 | 0.40000 | 6.81432 | 11.77388 |
| d8 | 8.57309 | 4.06711 | 0.70000 |
| d14 | 2.59922 | 7.39024 | 13.64079 |
| d16 | 3.67570 | 3.11272 | 1.49508 |
| d18 | 0.50000 | 0.50000 | 0.50000 |

| Group | Initial surface | Focal length |
|---|---|---|
| 1 | 1 | 26.20270 |
| 2 | 4 | −5.10486 |
| 3 | 9 | 7.48319 |
| 4 | 15 | 32.58983 |
| 5 | 17 | 33.09132 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L9, L10 | 1.530710 | 1.527870 | 1.537400 | 1.542740 | 1.547272 |
| L2, L5 | 1.622630 | 1.619350 | 1.630050 | 1.635825 | 1.640604 |
| L1, L4 | 1.772600 | 1.759150 | 1.802670 | 1.832960 | 1.863180 |
| L6 | 1.583126 | 1.580139 | 1.589960 | 1.595296 | 1.599721 |
| L11 | 1.516330 | 1.513855 | 1.521905 | 1.526213 | 1.529768 |
| L3 | 1.882997 | 1.876560 | 1.898221 | 1.910495 | 1.920919 |
| L7 | 1.696797 | 1.692974 | 1.705522 | 1.712339 | 1.718005 |
| L8 | 1.698947 | 1.692225 | 1.715424 | 1.729410 | 1.741890 |

EXAMPLE 8

| | Unit mm | | | | |
|---|---|---|---|---|---|
| | Surface data | | | | |
| Surface no. | r | d | nd | vd | effective radius |
| Object plane | ∞ | | | | |
| 1* | 12.3956 | 0.1000 | 1.67233 | 20.43 | 6.353 |
| 2* | 9.4199 | 2.9979 | 1.69350 | 53.20 | 5.987 |
| 3* | 31.0851 | Variable | | | 5.200 |
| 4 | 31.1783 | 0.7000 | 1.88300 | 40.76 | 4.540 |
| 5 | 4.1032 | 2.3000 | | | 3.229 |
| 6* | −20.7918 | 0.7000 | 1.67233 | 20.43 | 3.137 |
| 7* | −5.8661 | 0.8000 | 1.69350 | 53.20 | 3.140 |
| 8* | −22.0338 | Variable | | | 3.200 |
| 9 (stop) | ∞ | −0.3000 | | | 2.015 |
| 10* | 5.2051 | 1.8017 | 1.58313 | 59.38 | 2.024 |
| 11* | −8.5222 | 0.1000 | | | 2.000 |
| 12 | 7.3282 | 1.6052 | 1.69680 | 55.53 | 2.015 |
| 13 | −11.1472 | 0.3000 | 1.69895 | 30.13 | 1.897 |
| 14 | 3.3715 | Variable | | | 1.797 |
| 15 | −12.6078 | 1.5000 | 1.53071 | 55.69 | 2.360 |
| 16 | −7.6804 | Variable | | | 2.686 |
| 17* | 17.8893 | 1.2000 | 1.53071 | 55.69 | 3.509 |
| 18 | ∞ | 0.5000 | | | 3.623 |

-continued

| | | | | | |
|---|---|---|---|---|---|
| 19 | ∞ | 0.5000 | 1.51633 | 64.14 | 3.711 |
| 20 | ∞ | 0.5500 | | | 3.769 |
| Image plane (Light receiving surface) | ∞ | | | | |

Aspherical surface data

1st surface

K = 0.
A2 = 0.0000E+00, A4 = −2.5484E−05, A6 = 6.7032E−07, A8 = 2.6208E−09, A10 = 0.0000E+00

2nd surface

K = 0.
A2 = 0.0000E+00, A4 = −4.4436E−05, A6 = 6.0508E−07, A8 = 4.9964E−09, A10 = 0.0000E+00

3rd surface

K = 0.
A2 = 0.0000E+00, A4 = −2.9796E−05, A6 = 2.2967E−06, A8 = −2.1107E−08, A10 = 1.1132E−10

6th surface

K = 32.7737
A2 = 0.0000E+00, A4 = −7.2854E−04, A6 = 4.4767E−05, A8 = −1.0994E−05, A10 = 3.5289E−07

7th surface

K = 0.
A2 = 0.0000E+00, A4 = −2.7837E−04, A6 = −7.9018E−05, A8 = 0.0000E+00, A10 = 0.0000E+00

8th surface

K = 0.
A2 = 0.0000E+00, A4 = −1.6089E−03, A6 = 2.9889E−07, A8 = −3.6133E−06, A10 = 0.0000E+00

10th surface

K = 0.1640
A2 = 0.0000E+00, A4 = −1.9479E−03, A6 = 7.4446E−06, A8 = 8.9493E−06, A10 = −3.9133E−07

11th surface

K = −6.0027
A2 = 0.0000E+00, A4 = −7.9393E−04, A6 = 4.1451E−05, A8 = 1.1822E−05, A10 = 0.0000E+00

17th surface

K = 0.
A2 = 0.0000E+00, A4 = −1.2037E−03, A6 = 1.9236E−05, A8 = 0.0000E+00, A10 = 0.0000E+00

| Various data | Wide angle | Intermediate | Telephoto |
|---|---|---|---|
| FL | 4.79979 | 12.63305 | 33.59978 |
| Fno. | 2.9486 | 4.1986 | 5.9801 |
| ω | 42.6° | 16.6° | 6.4° |
| Image height | 3.83 | 3.83 | 3.83 |
| Lens total length | 30.9038 | 35.7522 | 43.3028 |
| d3 | 0.30000 | 5.79503 | 10.80364 |
| d8 | 9.35831 | 4.07745 | 0.70000 |
| d14 | 2.60068 | 7.51586 | 14.94905 |
| d16 | 3.29013 | 2.99363 | 1.49748 |
| d18 | 0.50000 | 0.50000 | 0.50000 |

| Group | Initial surface | Focal length |
|---|---|---|
| 1 | 1 | 27.41785 |
| 2 | 4 | −5.41295 |
| 3 | 9 | 7.43436 |
| 4 | 15 | 33.49410 |
| 5 | 17 | 33.70827 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L9, L10 | 1.530710 | 1.527870 | 1.537400 | 1.542740 | 1.547272 |
| L2, L5 | 1.693500 | 1.689550 | 1.702580 | 1.709705 | 1.715640 |
| L1, L4 | 1.672330 | 1.661700 | 1.694610 | 1.716930 | 1.738810 |
| L6 | 1.583126 | 1.580139 | 1.589960 | 1.595296 | 1.599721 |
| L11 | 1.516330 | 1.513855 | 1.521905 | 1.526213 | 1.529768 |
| L3 | 1.882997 | 1.876560 | 1.898221 | 1.910495 | 1.920919 |
| L7 | 1.696797 | 1.692974 | 1.705522 | 1.712339 | 1.718005 |
| L8 | 1.698947 | 1.692225 | 1.715424 | 1.729410 | 1.741890 |

-continued

|  | Example 1 | Example 2 | Example 3 | Example 4 |
|---|---|---|---|---|
| fw (Wide angle) | 4.797 | 4.799 | 4.800 | 4.800 |
| fs (Intermediate) | 10.621 | 11.532 | 12.560 | 12.500 |
| ft (Telephoto) | 23.960 | 23.984 | 33.593 | 33.598 |
| Half angle of field ωw (Wide angle) | 42.4° | 42.3° | 42.8° | 42.9° |
| Half angle of field ωs (Intermediate) | 18.9° | 17.7° | 16.5° | 16.6° |
| Half angle of field ωt (Telephoto) | 8.8° | 8.8° | 6.4° | 6.4° |
| Focal length which is any one of from 1.2 fw to 1.8 fw | 6.543 | 6.942 | 7.966 | 7.632 |
| Movement amount of G1 with respect to a position of G1 at wide angle end at the above focal length state | −2.315 | −1.611 | −1.545 | −0.618 |
| Movement amount of G2 with respect to a position of G2 at wide angle end at the above focal length state | −0.344 | +0.377 | +0.615 | +0.949 |
| G1-2 distance | 2.372 | 2.388 | 2.560 | 1.867 |
| G2-3 distance | 5.300 | 5.673 | 5.001 | 5.118 |
| G3-4 distance | 4.206 | 4.916 | 4.152 | 3.345 |
| G4-G5 or G4-filter distance | 2.191 | 2.133 | 4.307 | 4.756 |
| y10 | 3.83 | 3.83 | 3.83 | 3.83 |
| b (LA) | 2.25812 | 2.09905 | 2.25812 | 2.09905 |
| vd (LA) | 23.38 | 14.57 | 23.38 | 14.57 |
| nd (LA) | 1.63387 | 1.71003 | 1.63387 | 1.71003 |
| vd (LB) | 55.69 | 55.69 | 55.69 | 55.69 |
| θgF | 0.6684 | 0.7222 | 0.6684 | 0.7222 |
| βgF (LA) | 0.8007 | 0.8047 | 0.8007 | 0.8047 |
| (ra + rb)/(ra − rb) | 1.411 | 2.109 | 1.295 | 2.345 |
| a | 2.136 | 2.136 | 2.582 | 2.583 |
| h (= 0.9*a) | 1.922 | 1.922 | 2.324 | 2.324 |
| ΔzA(h) | −0.02723 | −0.02730 | −0.05038 | −0.06831 |
| ΔzB(h) | −0.03326 | −0.03271 | −0.07096 | −0.08491 |
| ΔzC(h) | 0.00153 | −0.01837 | −0.01090 | −0.05914 |
| ΔzC(h) − ΔzA(h) | 0.02876 | 0.00893 | 0.03948 | 0.00917 |
| ΔzC(h) − ΔzB(h) | 0.03479 | 0.01434 | 0.06006 | 0.02577 |
| P(LA) | 1.230E−03 | 6.129E−04 | 1.689E−03 | 6.294E−04 |
| P(LB) | 6.247E−04 | 2.575E−04 | 1.078E−03 | 4.627E−04 |
| {P(LA) − P(LB)}/y10 | 1.581E−04 | 9.280E−05 | 1.593E−04 | 4.351E−05 |
| |ΔnAB| | 0.10316 | 0.10316 | 0.17932 | 0.17932 |
| n21 | 1.88300 | 1.88300 | 1.88300 | 1.88300 |
| Total length at wide angle end/total length at telephoto end | 0.6722 | 0.6927 | 0.6933 | 0.6814 |
| Movement amount of G2/movement amount of G1 | 0.3278 | 0.3158 | 0.1221 | 0.1992 |
| Focal length of G2/focal length of G1 | −0.1860 | −0.1899 | −0.1863 | −0.1874 |
| $y_{07}/(fw*\tan\omega_{07w})$ | 0.933 | 0.939 | 0.939 | 0.940 |

|  | Example 5 | Example 6 | Example 7 | Example 8 |
|---|---|---|---|---|
| fw (Wide angle) | 4.800 | 4.800 | 4.800 | 4.800 |
| fs (Intermediate) | 12.583 | 12.598 | 12.717 | 12.633 |
| ft (Telephoto) | 33.596 | 33.596 | 33.594 | 33.600 |
| Half angle of field ωw (Wide angle) | 42.8° | 42.7° | 43.2° | 42.6° |
| Half angle of field ωs (Intermediate) | 16.5° | 16.6° | 16.4° | 16.6° |
| Half angle of field ωt (Telephoto) | 6.4° | 6.4° | 6.3° | 6.4° |
| Focal length which is any one of from 1.2 fw to 1.8 fw | 7.901 | 7.861 | 7.819 | 8.077 |
| Movement amount of G1 with respect to a position of G1 at wide angle end at the above focal length state | −1.536 | −1.590 | −1.713 | −0.666 |
| Movement amount of G2 with respect to a position of G2 at wide angle end at the above focal length state | +0.738 | +0.732 | +0.854 | +1.424 |
| G1-2 distance | 2.674 | 2.722 | 2.967 | 2.390 |
| G2-3 distance | 5.136 | 5.183 | 5.461 | 5.406 |
| G3-4 distance | 3.941 | 3.927 | 3.813 | 3.417 |
| G4-G5 or G4-filter distance | 4.528 | 4.520 | 4.716 | 4.979 |
| y10 | 3.83 | 3.83 | 3.83 | 3.83 |
| b(LA) | 2.21781 | 2.25812 | 2.24653 | 2.21781 |
| vd(LA) | 20.43 | 23.38 | 17.75 | 20.43 |
| nd(LA) | 1.67233 | 1.63387 | 1.77260 | 1.67233 |
| vd(LB) | 55.69 | 58.16 | 58.16 | 53.20 |
| θgF | 0.6786 | 0.6684 | 0.6960 | 0.6786 |
| βgF(LA) | 0.7942 | 0.8007 | 0.7965 | 0.7942 |
| (ra + rb)/(ra − rb) | 1.588 | 1.462 | 2.035 | 1.786 |
| a | 2.582 | 2.582 | 2.582 | 2.583 |
| h (= 0.9*a) | 2.324 | 2.324 | 2.324 | 2.324 |
| ΔzA(h) | −0.05403 | −0.04255 | −0.06279 | −0.03921 |
| ΔzB(h) | −0.07391 | −0.05734 | −0.07309 | −0.04996 |
| ΔzC(h) | −0.03419 | −0.00516 | −0.05032 | −0.02057 |

-continued

|  | | | | |
|---|---|---|---|---|
| $\Delta zC(h) - \Delta zA(h)$ | 0.01984 | 0.03739 | 0.01247 | 0.01864 |
| $\Delta zC(h) - \Delta zB(h)$ | 0.03972 | 0.05218 | 0.02277 | 0.02939 |
| P(LA) | 9.711E−04 | 1.599E−03 | 7.025E−04 | 9.124E−04 |
| P(LB) | 7.132E−04 | 8.972E−04 | 3.915E−04 | 5.524E−04 |
| {P(LA) − P(LB)}/y10 | 6.733E−05 | 1.833E−04 | 8.121E−05 | 9.398E−05 |
| \|ΔnAB\| | 0.14162 | 0.01124 | 0.14997 | 0.02117 |
| n21 | 1.88300 | 1.88300 | 1.88300 | 1.88300 |
| Total length at wide angle end/total length at telephoto end | 0.6965 | 0.7010 | 0.7148 | 0.7137 |
| Movement amount of G2/movement amount of G1 | 0.1187 | 0.1118 | 0.0795 | 0.1529 |
| Focal length of G2/focal length of G1 | −0.1887 | −0.1883 | −0.1948 | −0.1974 |
| $y_{07}/(fw*\tan\omega_{07w})$ | 0.937 | 0.933 | 0.920 | 0.948 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 17:
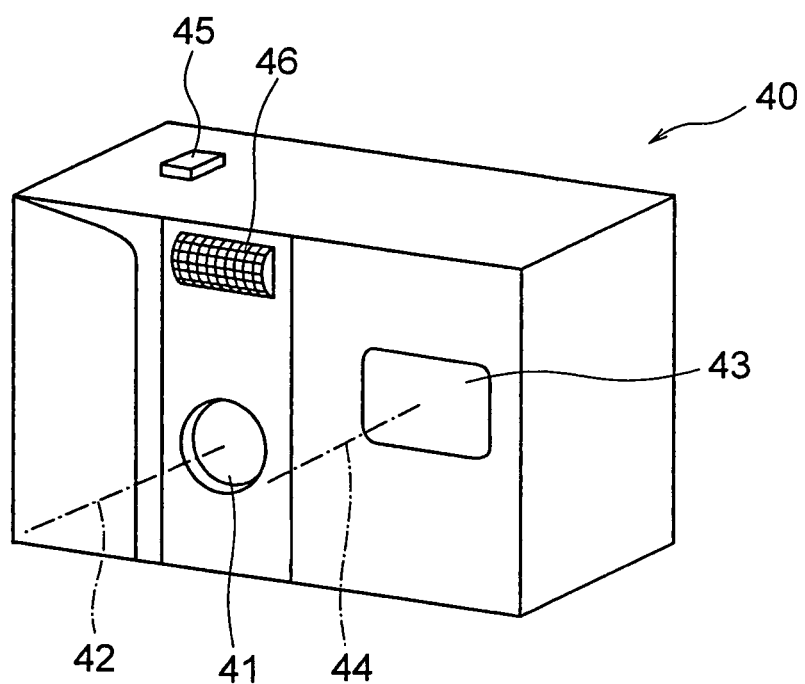
FIG. 17 is a front perspective view showing an appearance of a digital camera 40 in which, a zooming optical system according to the present invention is incorporated.
Figure 18:
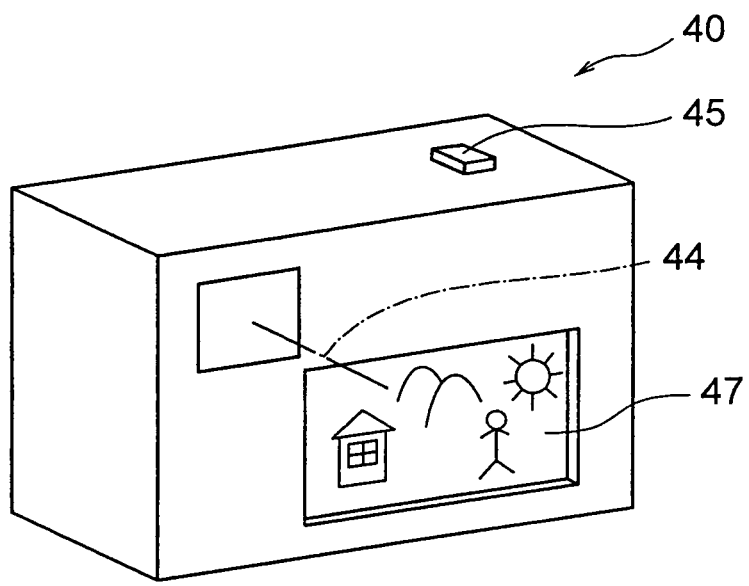
FIG. 18 is a rear perspective view of the digital camera 40.
Figure 19:
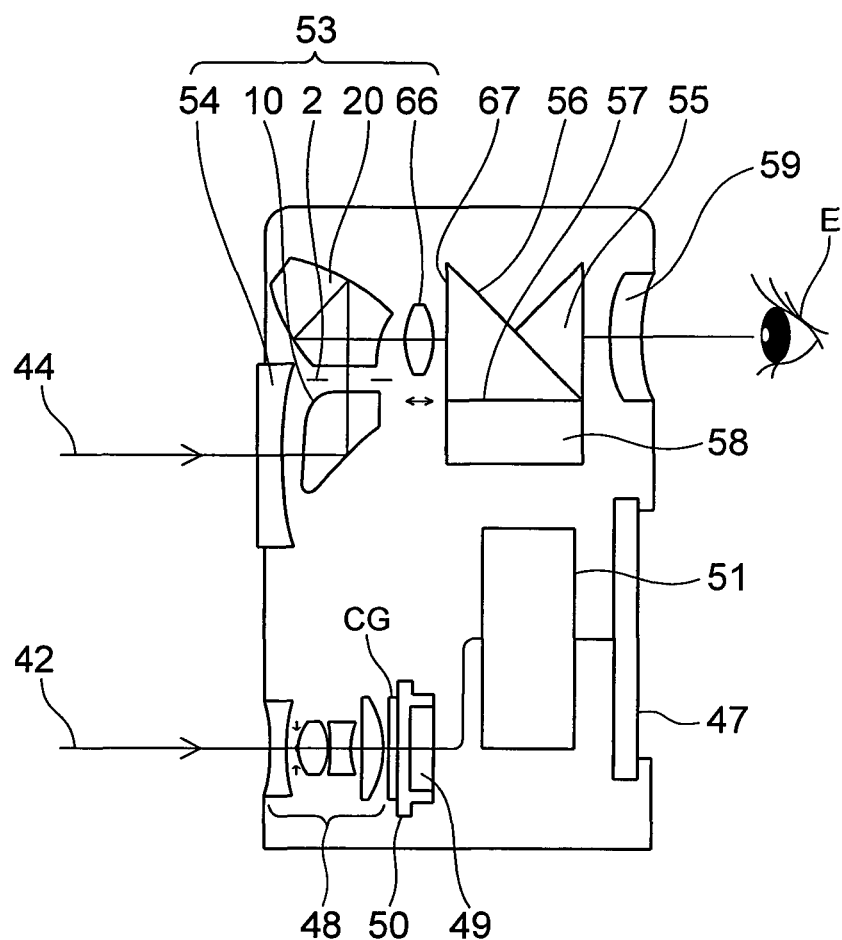
FIG. 19 is a cross-sectional view showing an optical arrangement of the digital camera 40.

In FIG. 17 to FIG. 19 show conceptual diagrams of structures in which the image forming optical system according to the present invention is incorporated in a photographic optical system 41 of a digital camera. FIG. 17 is a frontward perspective view showing an appearance of a digital camera 40, FIG. 18 is a rearward perspective view of the same, and FIG. 19 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Further, the present invention could be applied to the above-mentioned collapsible type digital camera as well as a bending type (an optical path reflecting type) digital camera having a bending optical system (optical path reflecting lens).

Figure 20:
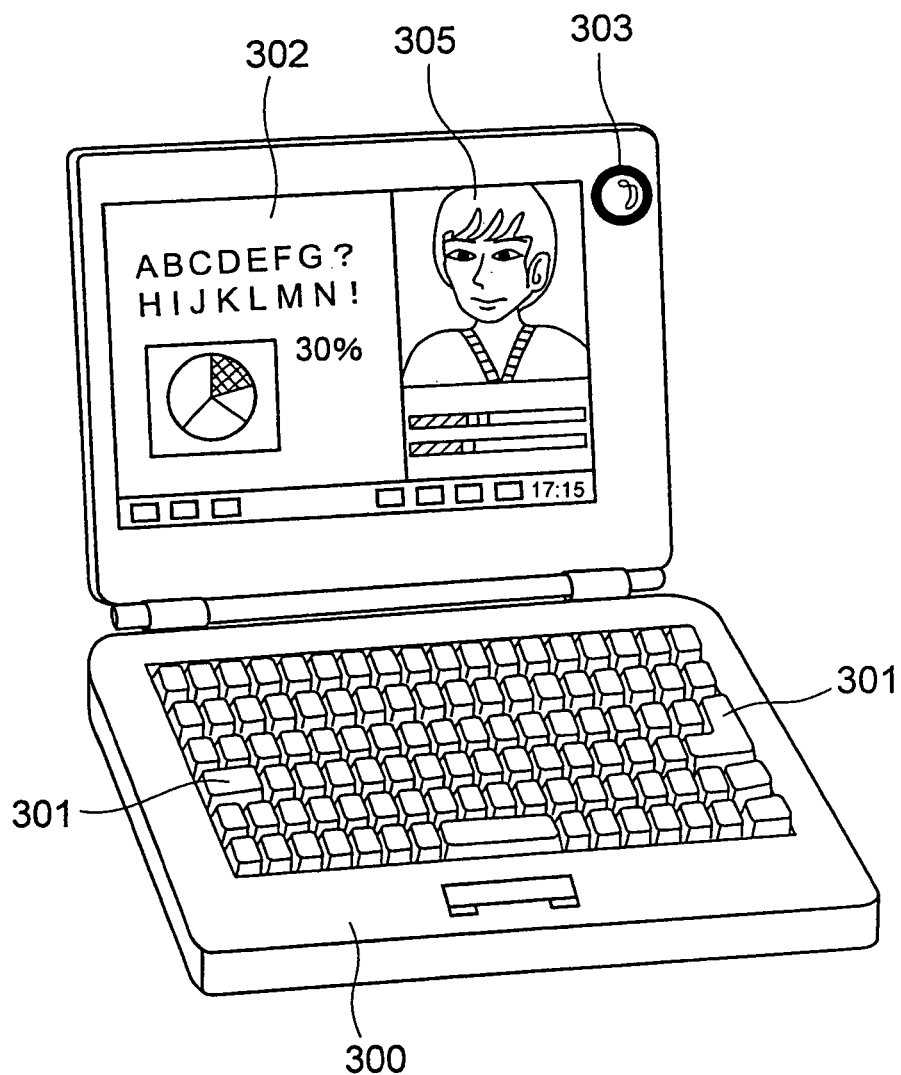
FIG. 20 is a front perspective view of a state in which, a cover of a personal computer 300 which is an example of an information processing apparatus in which, the zooming optical system of the present invention is built-in as an objective optical system, is opened.
Figure 21:
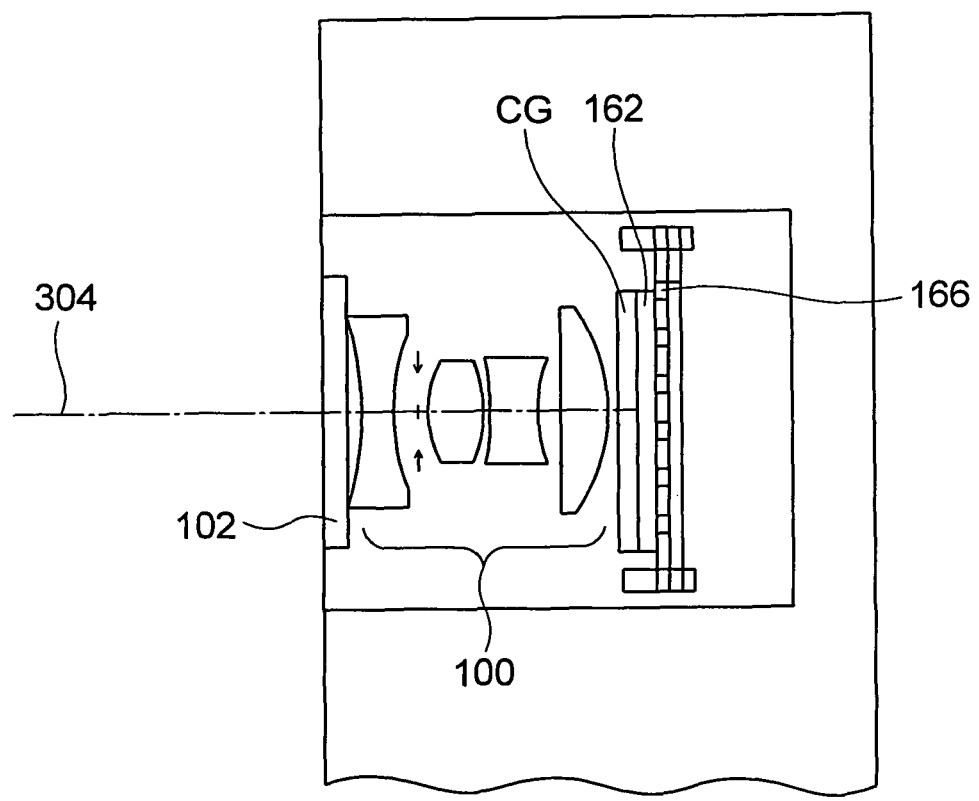
FIG. 21 is a cross-sectional view of a photographic optical system 303 of the personal computer 300.
Figure 22:
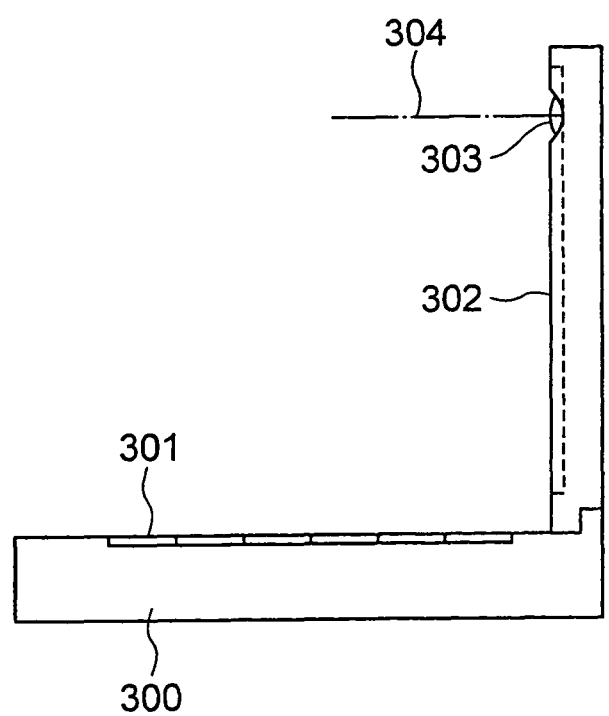
FIG. 22 is a side view of the personal computer 300.

Next, a personal computer which is an example of an information processing apparatus with a built-in image forming system as an objective optical system is shown in FIG. 20 to FIG. 22. FIG. 20 is a frontward perspective view of a personal computer 300 with its cover opened, FIG. 21 is a cross-sectional view of a photographic optical system 303 of the personal computer 300, and FIG. 22 is a side view of FIG. 20. As it is shown in FIG. 20 to FIG. 22, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 20, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 23A:
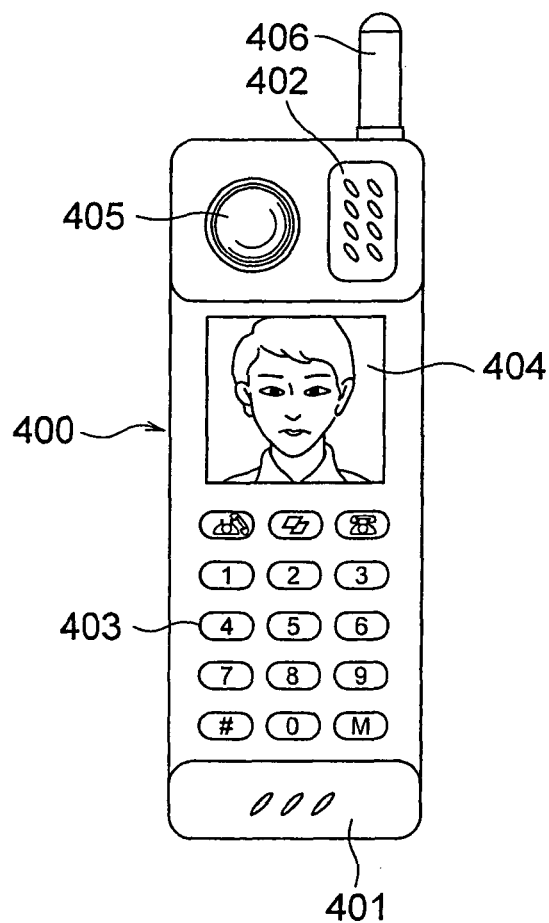
FIG. 23A, FIG. 23B, and FIG. 23C are diagrams showing a mobile telephone which is an example of the information processing apparatus in which, the zooming optical system of the present invention is built-in as a photographic optical system, where.
Figure 23B:
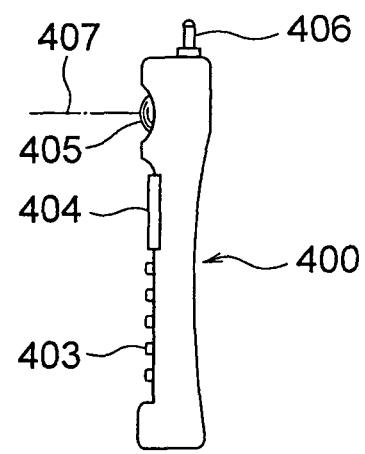
Figure 23C:
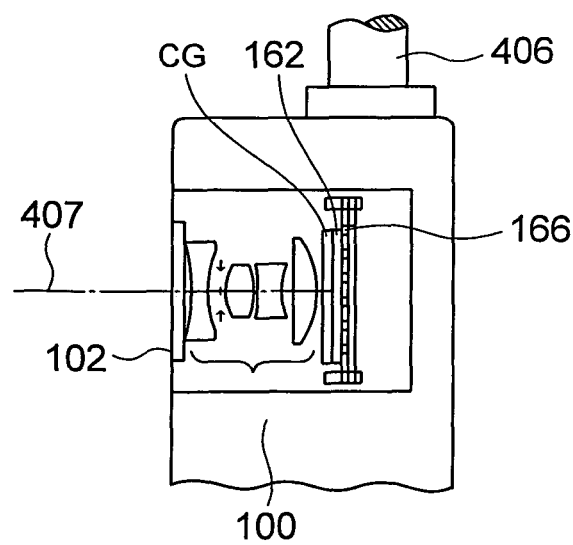

Next, a telephone which is an example of an information processing apparatus in which the image forming optical system of the present invention is built-in as a photographic optical system, particularly a portable telephone which is easy to carry is shown in FIG. 23A, FIG. 23B, and FIG. 23C. FIG. 23A is a front view of a portable telephone 400, FIG. 23B is a side view of the portable telephone 400, and FIG. 23C is a cross-sectional view of a photographic optical system 405. As shown in FIG. 23A to FIG. 23C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

As it has been described above, the image forming optical system, and the electronic image pickup apparatus using the same are useful for having a high zoom ratio, slimming, and a wide angle of field of the image forming optical system, and for slimming of the electronic image pickup apparatus.

The present invention is related to a lens arrangement which is effective for realizing a high zoom ratio, slimming, and improved performance of the image forming optical system, and application thereof for slimming the electronic image pickup apparatus.

What is claimed is:

1. An image forming optical system comprising in order from an object side:
a first lens group G1 having a positive refractive power, which comprises only one cemented-lens component;
a second lens group G2 having a negative refractive power, which comprises two lens components namely, a negative lens component and a lens component of a cemented lens of a positive lens LA having a meniscus shape and a negative lens LB in order;
a third lens group G3 having a positive refractive power, which comprises two lens components namely, a positive lens component and a negative lens component; and
a fourth lens group G4 which comprises one lens component, wherein
the image forming optical system comprises maximum of five lens groups, and
at the time of zooming from a wide angle end to a telephoto end, when a focal length of the overall image forming optical system is in a range of 1.2 fw to 1.8 fw, the first lens group G1 moves to be positioned more toward the object side than a position at the wide angle end, and
in a rectangular coordinate system in which, a horizontal axis is let to be νd (LA) and a vertical axis is let to be nd(LA), when a straight line expressed by $$nd(LA)=a \times \nu d(LA)+b(LA) \text{(provided that } a=-0.0267\text{)}$$

is set, nd and νd of the positive lens LA are included in an area which is determined by a straight line when it is a lower limit value of a range of the following conditional expression (1) and a straight line when it is an upper limit value of the range of the following conditional expression (1), and an area determined by the following conditional expression (2)

$$2.0 < b(LA) < 2.4 \text{(provided that } nd(LA)>1.3\text{)} \quad (1)$$

$$\nu d(LA) < 30 \quad (2)$$

where,
fw denotes a focal length of the image forming optical system at wide angle end,
νd(LA) denotes Abbe's number (nd(LA)−1)/(nF(LA)−nC(LA)) for the positive lens LA, and
nd(LA), nC(LA), nF(LA) denote refractive indices of the positive lens LA for a d-line, a C-line, and an F-line respectively.

2. The image forming optical system according to claim 1, wherein
in a rectangular coordinate system with a vertical axis let to be θgF(LA), when a straight line expressed by $$\theta gF(LA)=\alpha gF \times \nu d(LA)+\beta gF(LA) \text{(provided that } \alpha gF=-0.00566\text{)}$$

is set, θgF, nd, and νd of the positive lens are included in an area determined by a straight line when it a lower limit value of a range of the following conditional expression (3) and a straight line when it is an upper limit value of the range of the following conditional expression (3), and the area determined by conditional expressions (1) and (2)

$$0.7700 < \beta gF(LA) < 0.8300 \quad (3)$$

where,
θgF(LA) denotes a partial dispersion ratio (ng−nF)/ (nF−nC) of the positive lens LA, and
ng(LA) denotes a refractive index for a g-line, of the positive lens LA.

3. The image forming optical system according to claim 1, wherein a shape factor of the positive lens LA satisfies the following conditional expression (4)

$$1.1 < (ra+rb)/(ra-rb) < 6.0 \quad (4)$$

where,
ra denotes a radius of curvature on an optical axis of a surface on the object side of the positive lens LA, and
rb denotes a radius of curvature on the optical axis of a surface (a cemented surface) on an image side of the lens LA.

4. The image forming optical system according to claim 1, wherein both air-contact surfaces of a lens component on an image side of the second lens group G2 have an aspheric shape which is deviated toward the image side with respect to a spherical surface of a respective radius of curvature on an optical axis, and when coordinate axes are let to be such that, an optical axial direction is z, and a direction perpendicular to the optical axis is h, R is let to be a radius of curvature on an optical axis of a spherical surface component, k is let to be a conical constant, and $A_4, A_6, A_8, A_{10}, \ldots$ are let to be aspherical coefficients, and when a shape of the aspheric surface is expressed by the following expression (5)

$$z = h^2/R[1+\{1-(1+k)h^2/R^2\}^{1/2}] + A_4 h^4 + A_6 h^6 + A_8 h^{8} + A_{10} h^{10} + \quad (5), \text{ and}$$

when an amount of deviation is expressed by the following expression (6)

$$\Delta z = z - h^2/R[1+\{1-h^2/R^2\}^{1/2}] \quad (6)$$

the image forming optical system satisfies the following conditional expression (7)

$$\Delta z_A(h) \leq 0, \Delta z_B(h) \leq 0 (\text{provided that } h=0.9a), \text{ and}$$

$$-3.0e\text{-}4 \leq \{P(LA)-P(LB)\}/y_{10} \leq +2.0e\text{-}3 (\text{provided that } h=0.9a) \quad (7)$$

where $z_A$ is a shape of an air-contact surface of the positive lens LA, which is according to expression (5), $z_B$ is a shape of an air-contact surface of the negative lens LB, which is according to conditional expression (5), $z_c$ is a shape of the cemented surface, which is according to conditional expression (5), $\Delta z_A$ denotes an amount of deviation with respect to a spherical surface of a radius of curvature on the optical axis, of the air-contact surface of the positive lens LA, which is according to conditional expression (6), $\Delta z_B$ denotes an amount of deviation with respect to a spherical surface of a radius of curvature on the optical axis, of the air-contact surface of the positive lens LB, which is according to conditional expression (6), $\Delta z_c$ denotes an amount of deviation with respect to a spherical surface of a radius of curvature on the optical axis, of the cemented surface, which is according to conditional expression (6), vd(LA) denotes Abbe's number (ndA−1)/(nFA−nCA) for the d-line, of the positive lens LA, vd(LB) denotes Abbe's number (ndB−1)/(nFB−nCB) for the d-line, of the negative lens LB, ndA, nCA, and nFA denote refractive indices of the positive lens LA, for the d-line, the C-line, and the F-line respectively, ndB, nCB, and nFB denote refractive indices of the negative lens LB, for the d-line, the C-line, and the F-line respectively, P(LA) is a parameter related to an aspheric surface and dispersion of the positive lens LA, and is expressed by the following expression $$P(LA) = (\Delta z_c(h) - \Delta z_A(h))/vd(LA),$$

P(LB) is a parameter related to an aspheric surface and dispersion of the negative lens LB, and is expressed by the following expression $$P(LB) = (\Delta z_c(h) - \Delta z_B(h))/vd(LB),$$

a is an amount according the following conditional expression (8)

$$a = (y_{10})^2 \cdot \log_{10} \gamma / fw \quad (8)$$

where, both the air-contact surfaces may be spherical surfaces, $y_{10}$ is a distance (the maximum image height) up to the farthest point from a center, in an effective image pickup surface (in a surface in which an image can be picked up) of an electronic image pickup apparatus which is disposed near an image forming position of the image forming optical system according to the present invention, fw is a focal length of the overall image forming optical system at a wide angle end, γ is a zooming ratio (a focal length of the overall image forming optical system at a telephoto end/a focal length of the overall image forming optical system at the wide angle end), and moreover, for letting an apex of each surface to be an origin point, z(0)=0 all the time.

5. The image forming optical system according to claim 1, wherein the image forming optical system satisfies the following conditional expression (9)

$$|\Delta nAB| < 0.18 \quad (9)$$

where,

ΔnAB denotes a difference between a refractive index for the d-line of a medium of the positive lens LA and a refractive index for the d-line of a medium of the negative lens LB.

6. The image forming optical system according to claim 1, wherein a refractive index n21 for a d-line of a medium of a negative lens in a negative lens component L21 nearest to the object side in the second lens group G2 satisfies the following conditional expression $$n21 > 1.85 \quad (10).$$

7. The image forming optical system according to claim 1, wherein an overall length of the image forming optical system at the wide angle end is not more than 0.75 times of an overall length of the image forming optical system at the telephoto end.

8. The image forming optical system according to claim 1, wherein an absolute value of a ratio of an amount of movement of the second lens group G2 to an amount of movement of the first lens group G1 at the time of zooming from the wide angle end to the telephoto end is not more than 0.4.

9. The image forming optical system according to claim 1, wherein an absolute value of a ratio of a combined focal length of the second lens group G2 to a combined focal length of the first lens group G1 is not more than 0.25 (provided that an object point is at infinity).

10. The image forming optical system according to claim 1, wherein when a focal length f of the overall image forming optical system at the time of zooming is in a range of 1.2 fw to 1.8 fw, the second lens group G1 moves to be positioned more toward an image side than a position at the wide angle end.

11. The image forming optical system according to claim 1, wherein at the time of zooming from the wide angle end to the telephoto end, the third lens group G3 moves only toward the object side.

12. The image forming optical system according to claim 1, wherein when focused at an object at infinity, a position at the telephoto end of the fourth lens group G4 is drawn toward the image side than a position at the wide angle end.

13. An electronic image pickup apparatus comprising:
an image forming optical system according to claim 1;
an electronic image pickup element; and
an image processing unit which processes image data which has been obtained by picking up an image formed through (by) the image forming optical system by the electronic image pickup element, and outputs as image data in which, a shape (a form) of the image has been changed, wherein the image forming optical system satisfies the following conditional expression (A) at the time of infinite object point focusing, $$0.85 < y_{07}/(f_w \cdot \tan \omega_{07w}) < 0.97 \qquad (A)$$

where, $y_{07}$ is expressed as $y_{07} = 0.7 \cdot y_{10}$, when a distance (the maximum image height) from a center up to the farthest point on an effective image pickup surface (on a surface on which an image can be picked up) of the electronic image pickup element is let to be $y_{10}$, $\omega_{07w}$ is an angle with respect to an optical axis in an object-point direction corresponding to an image point from a center on the image pickup surface up to a position of $y_{07}$, at a wide angle end, and $f_w$ is a focal length of the overall image forming optical system at the wide angle end.

* * * * *